United States Patent [19]

Morishita

[11] Patent Number: 5,631,617

[45] Date of Patent: May 20, 1997

[54] SYSTEM FOR LEVITATING AND GUIDING OBJECT BY ELECTROMAGNETIC ATTRACTIVE FORCE

[75] Inventor: Mimpei Morishita, Tokyo, Japan

[73] Assignee: Kabushiki Kaisha Toshiba, Kawasaki, Japan

[21] Appl. No.: 573,874

[22] Filed: Dec. 18, 1995

Related U.S. Application Data

[63] Continuation of Ser. No. 111,514, Aug. 24, 1993, abandoned.

[30] Foreign Application Priority Data

Aug. 25, 1992 [JP] Japan ..................... 4-225492

[51] Int. Cl.$^6$ .................. H01F 1/00; H02K 7/09; B60L 13/00
[52] U.S. Cl. .................. 335/216; 310/90.5; 104/285
[58] Field of Search .................. 335/216; 310/90.5; 104/281–286

[56] References Cited

U.S. PATENT DOCUMENTS

| | | | |
|---|---|---|---|
| 4,879,537 | 11/1989 | Marshall | 335/216 |
| 5,159,219 | 10/1992 | Chu | 310/90.5 |
| 5,177,387 | 1/1993 | McMichael | 310/90.5 |
| 5,251,741 | 10/1993 | Morishita | 198/690.1 |
| 5,256,638 | 10/1993 | Weinberger | 505/1 |
| 5,270,601 | 12/1993 | Rigney | 310/90.5 |

FOREIGN PATENT DOCUMENTS

| | | | |
|---|---|---|---|
| 1-133840 | 5/1989 | Japan . | |
| 0549278 | 8/1991 | Japan | 335/216 |
| 4-109803 | 4/1992 | Japan . | |

*Primary Examiner*—Leo P. Picard
*Assistant Examiner*—Stephen T. Ryan
*Attorney, Agent, or Firm*—Oblon, Spivak, McClelland, Maier & Neustadt, P.C.

[57] ABSTRACT

A system for levitating and guiding an object by a magnetic force, which is typically a superconducting magnetic support apparatus or a superconducting linear convey system, comprises a support member, a superconductor unit, disposed on the support member, including a container having an inner space, a superconductor material for trapping magnetic fluxes generated at the time of transition from the normal conduction state to the superconduction state of the superconductor unit, and a refrigerant supply unit for supplying the inner space of the container with a refrigerant for setting the superconductor material in the superconducting state, a convey member situated to face the support member, a magnetic material disposed on the convey member so as to face the superconductor material, and a magnet, situated on the support member, for generating magnetic fluxes which enter the magnetic material through the superconductor material.

30 Claims, 17 Drawing Sheets

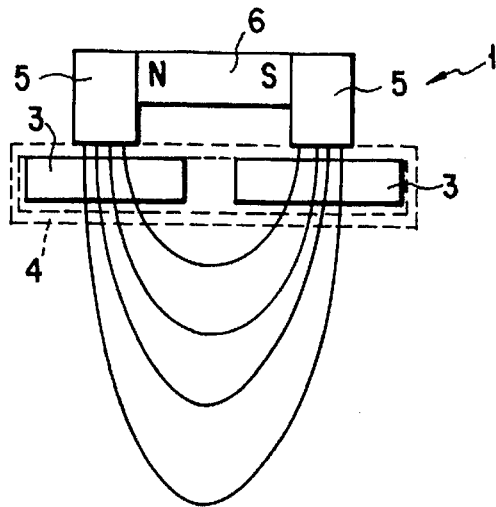
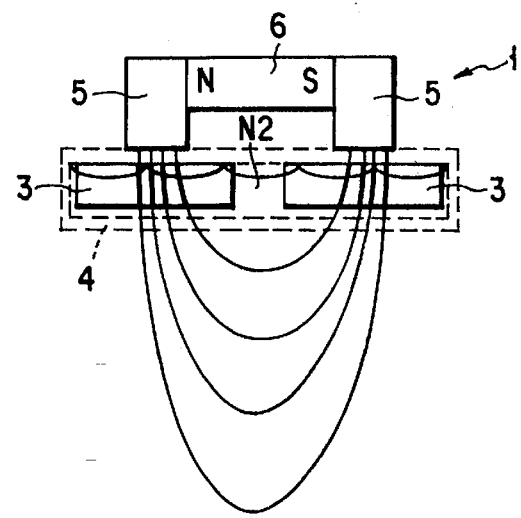
F I G. 4A  F I G. 4B
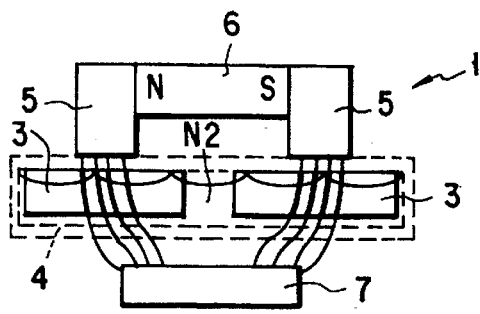
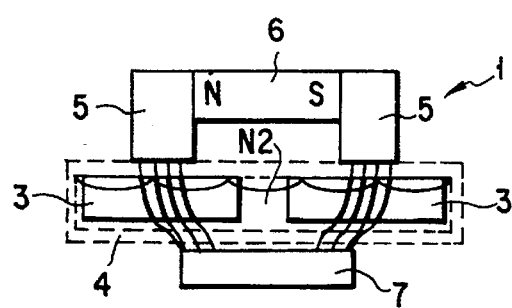
F I G. 4C  F I G. 4D
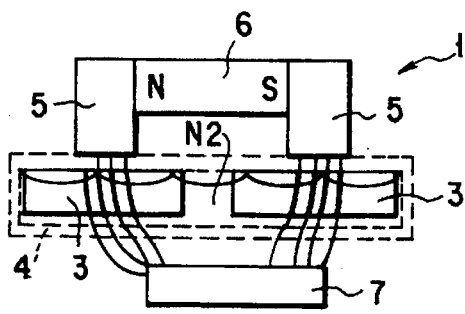
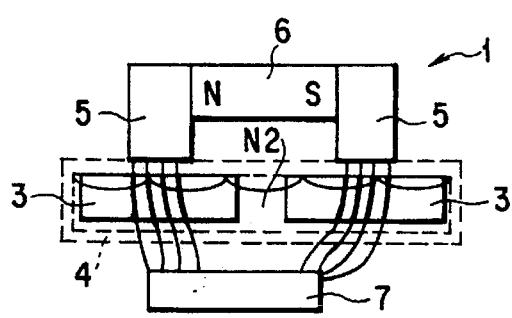
F I G. 4E  F I G. 4F

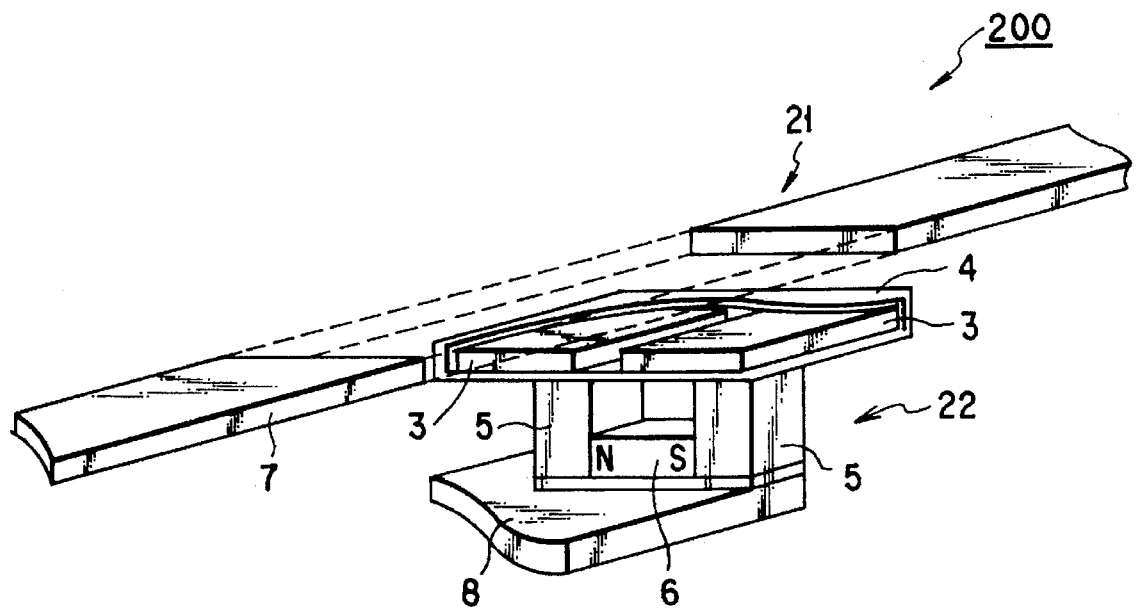
F I G. 15
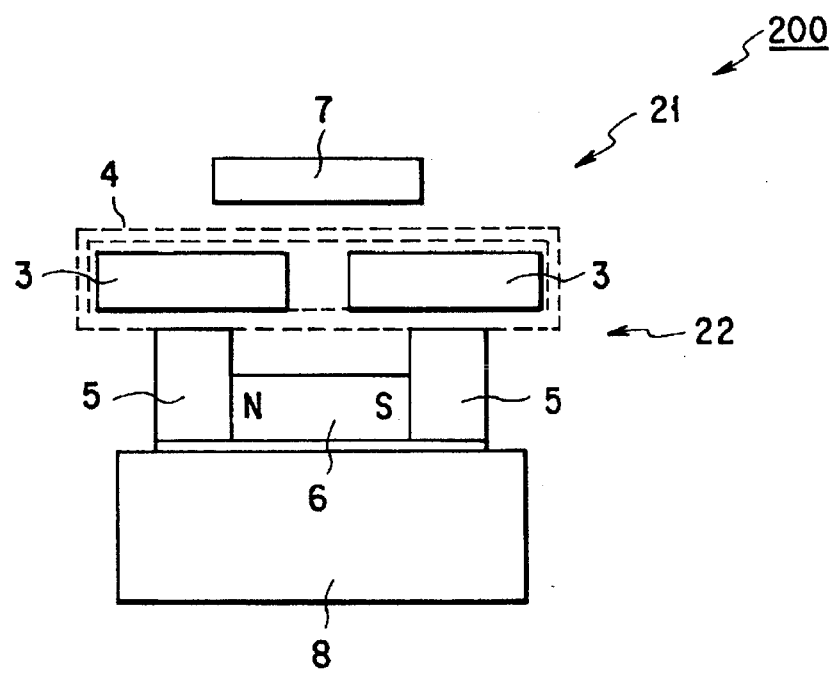
F I G. 16

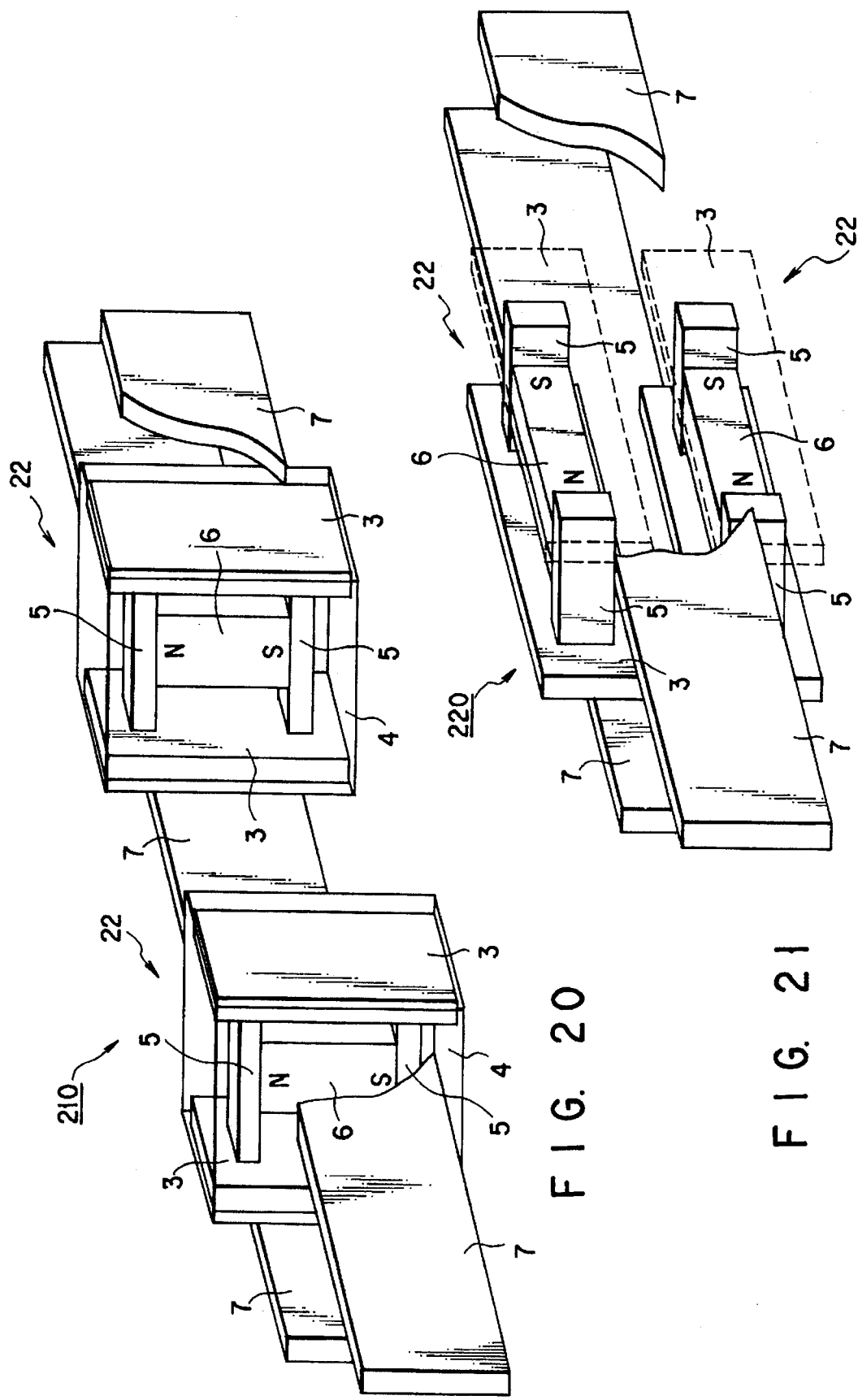

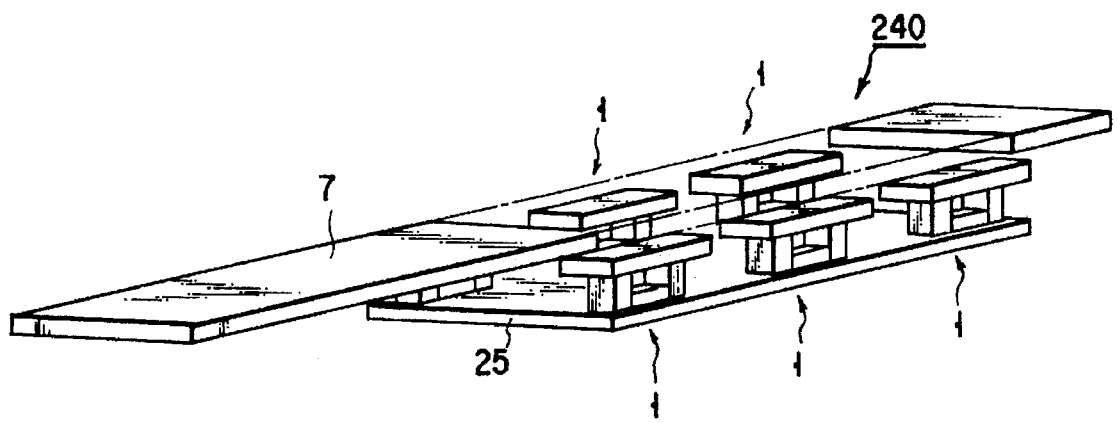
F I G. 23
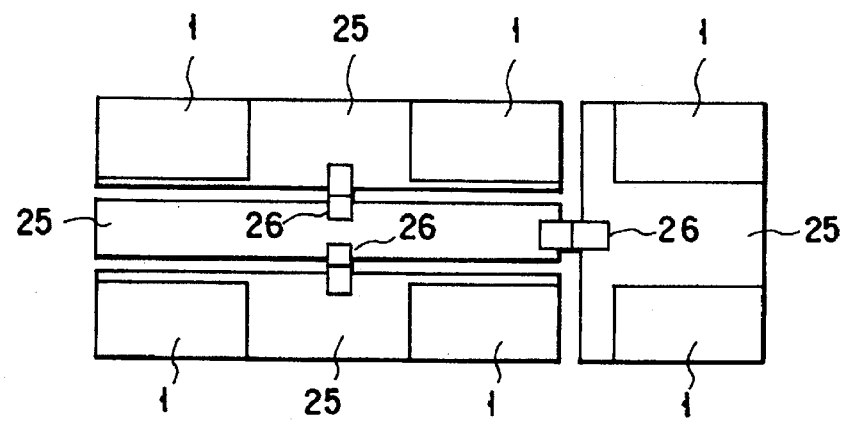
F I G. 24
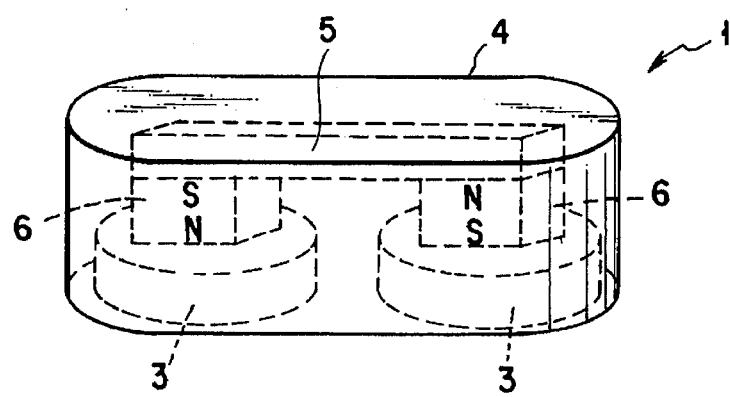
F I G. 26

SYSTEM FOR LEVITATING AND GUIDING OBJECT BY ELECTROMAGNETIC ATTRACTIVE FORCE

This application is a continuation of application Ser. No. 08/111,514, filed on Aug. 24, 1993, now abandoned.

BACKGROUND OF THE INVENTION

1. Field of the Invention

The present invention relates to a system for levitating and guiding an object by magnetic force, typical examples of which are a superconducting magnetic supporting apparatus and a superconducting linear convey system.

2. Description of the Related Art

In a convey apparatus used in a super-clean space of, e.g. a clean room, it is desired that no dust occurs during a convey operation. Accordingly, as regards the convey apparatus used in such an atmosphere, it is desired that a convey vehicle be run in a perfect non-contact state. In order to run the convey vehicle in the perfect non-contact state, it is necessary that the convey vehicle be levitated along a convey path by some means and a propelling force be applied to the convey vehicle in a perfect non-contact state.

There are several methods for levitating the convey vehicle along the convey path. In a generally employed system, the convey vehicle is levitated by magnetic force. There are two systems for levitating the convey vehicle by magnetic force: one requiring high-level control, and the other requiring no control. The latter contributes to simplification in design, manufacture and maintenance of the convey apparatus.

For example, Published Unexamined Japanese Patent Application (PUJPA) No. 1-133840 discloses a convey apparatus wherein means for magnetically levitating a convey vehicle with no control is achieved. In the convey apparatus disclosed in this document, a superconductor which comes into the superconducting state at a temperature equal to or higher than a liquid nitrogen temperature is mounted on a convey vehicle. The convey vehicle is levitated by making use of the Meissner effect caused by the superconductor in the superconducting state. Specifically, in this convey apparatus, the convey vehicle is levitated by a magnetic repulsion force created between the superconductor mounted on the convey vehicle and a magnetic field generating device provided on the convey path side. In this convey apparatus, a train of coils is provided on the convey path side. The superconductor is magnetically trapped between magnetic poles produced by exciting each coil of the coil train. By sequentially switching excitation of each coil, the trapping position is shifted. Thereby, a propelling force is applied to the convey vehicle.

However, in the above convey apparatus, since the convey vehicle is levitated and guided by making use of the Meissner effect of the superconductor, it is difficult to obtain a guide force enough to run the convey vehicle along the convey path. Consequently, when an external force such as a centrifugal force is applied to the convey vehicle, the convey vehicle tends to be derailed from the convey path and a problem remains with respect to the stability of running.

When the width of the superconductor is greater than the width of the levitation magnetic field applied from the convey path side, the magnetic guide force cannot be applied to the convey vehicle. Thus, the degree of freedom of design of the convey vehicle is low.

Furthermore, when the center of gravity of the convey vehicle deviates due to the weight of a load, etc., it is difficult to keep the desirable levitation state.

As has been described above, in the prior art, the convey vehicle is levitated and guided by making use of the Meissner effect of the superconductor, the degree of freedom of design of the convey vehicle is low. Moreover, when the center of gravity of the convey vehicle deviates due to the weight of a load, etc., it is difficult to keep the desirable levitation state.

SUMMARY OF THE INVENTION

The object of the present invention is to provide a system for levitating and guiding an object by magnetic force, which system requires no special control and can exhibit stable levitation characteristics and guide characteristics.

This object can be achieved by a system for levitating and guiding an object by magnetic force, comprising:

a first member;

a second member situated to face the first member; and levitating and guide force generating means for generating a levitating and guide force acting between the first member and the second member, the levitating and guide force generating means including a magnetic flux generating unit, disposed on the first member, for generating magnetic fluxes for producing a predetermined magnetic field, a magnetic material unit, situated on the second member, for receiving the magnetic fluxes generated by the magnetic flux generating unit, and a superconductor unit, provided on the first member between the magnetic flux generating unit and the magnetic material unit, for trapping the magnetic fluxes generated by the magnetic flux generating unit at the time of transition from the normal conduction state to the superconduction state of the superconductor unit.

The above object can also be achieved by a system for levitating and guiding an object by magnetic force, comprising:

a support member;

a convey member situated to face the support member;

a magnetic flux generating unit, disposed on the support member, for generating magnetic fluxes for producing a predetermined magnetic field;

a magnetic material unit, situated on the convey member, for receiving the magnetic fluxes generated by the magnetic flux generating unit; and a superconductor unit, provided on the support member between the magnetic flux generating unit and the magnetic material unit, for trapping the magnetic fluxes generated by the magnetic flux generating unit at the time of transition from the normal conduction state to the superconduction state of the superconductor unit, and producing a levitating and guide force on the basis of the trapped magnetic fluxes.

The above object can also be achieved by a system for levitating and guiding an object by magnetic force, comprising:

a convey member;

a support member situated to face the convey member;

a magnetic flux generating unit, disposed on the convey member, for generating magnetic fluxes for producing a predetermined magnetic field;

a magnetic material unit, situated on the support member, for receiving the magnetic fluxes generated by the magnetic flux generating unit; and a superconductor unit, provided on the convey member between the magnetic flux generating unit and the magnetic material unit, for trapping the magnetic fluxes generated by the magnetic flux generating unit at the time of transition from the normal conduction state to the superconduction state of the superconductor unit, and producing a levitating and guide force on the basis of the trapped magnetic fluxes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A to 4F illustrate the steps and the principle for obtaining a levitating force and a guide force in the present invention;

FIG. 15 is a schematic perspective view of the system of the present invention;

FIG. 16 is a cross-sectional view of a convey plane and a convey path, taken in a direction perpendicular to the convey direction of the apparatus shown in FIG. 15;

FIGS. 20 to 24 are perspective views showing other embodiments of the system of the present invention;

FIG. 26 is a perspective view showing another embodiment of the support device.

DETAILED DESCRIPTION OF THE PREFERRED EMBODIMENTS

Figure 1:
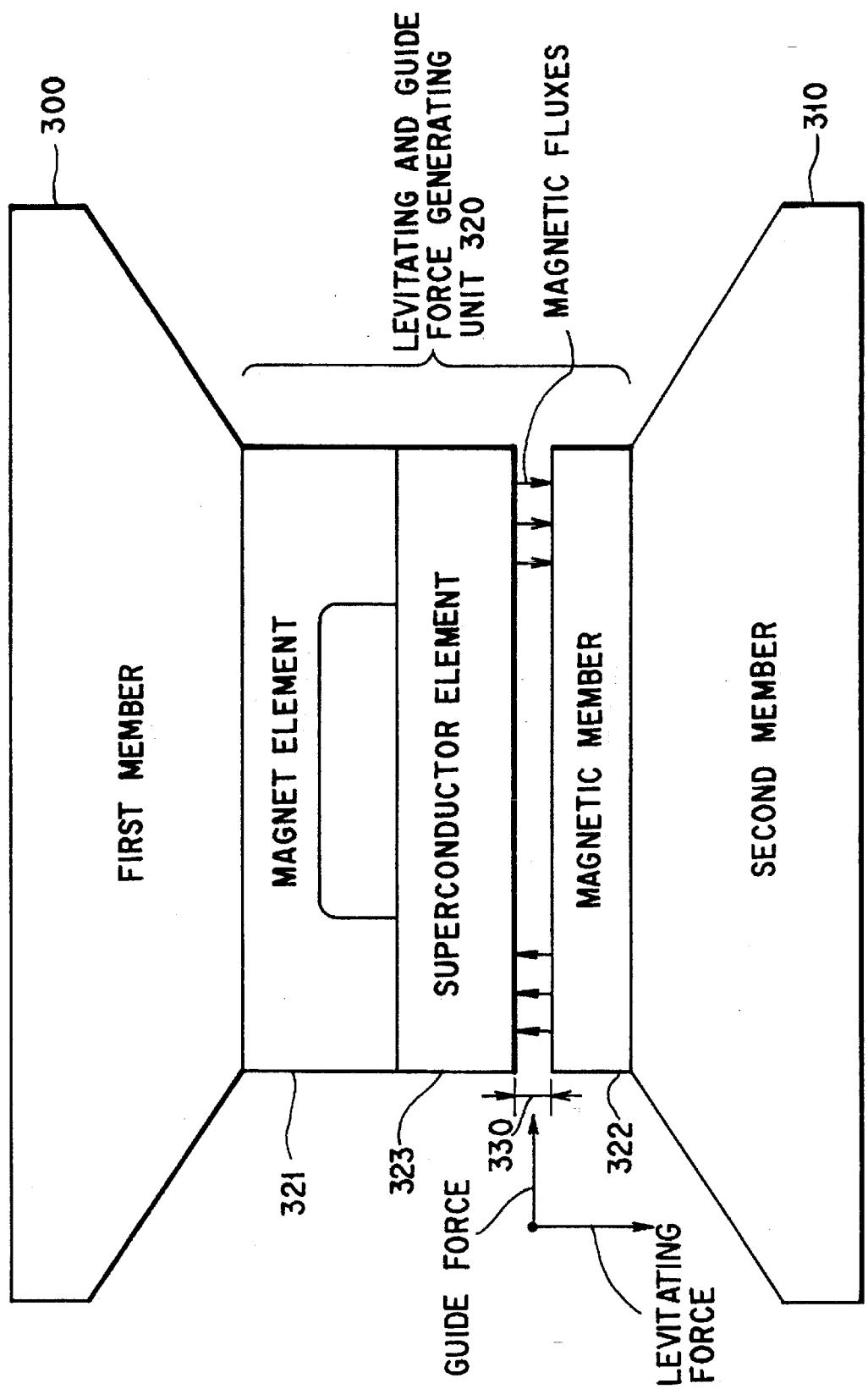
FIG. 1 illustrates the principle of the system of the present invention.

The principle of the present invention will now be described, before describing embodiments of the present invention. This invention provides a system for levitating and guiding an object by magnetic force, which system requires no special control and can exhibit stable levitation characteristics and guide characteristics. As is shown in FIG. 1, the system comprises a first member 300, a second member 310 opposed to the first member 300, and a levitating and guide force generating unit 320 for generating a levitating and guide force acting between the first member 300 and the second member 310. The force generating unit 320 is situated between the first member 300 and the second member 310. The levitating and guide force generating unit 320 comprises a magnet element 321 functioning as a magnetic flux generating unit, a magnetic material 322, and a superconducting element 323. The magnet element 321 is disposed on the first member 300 and generates magnetic fluxes for producing a predetermined magnetic field. The magnetic material 322 is disposed on the second member 310 and receives the magnetic fluxes generated by the magnet element 321. The superconductor element 323 is disposed on the first member 300 and located between the magnet element 321 and the magnetic material 322. The superconductor element 323 traps the magnetic fluxes generated from the magnetic element 321 at the time of transition between the normal conduction state and the superconduction state.

In this case, the first member 300 can be constituted as a convey member, and the second member 310 as a support member. Alternatively, the first member 300 may be constituted as a support member, and the second member 310 as a convey member. In the latter case, for example, it can be considered that a superconducting linear convey system is constituted by a support member comprising the first member 300, magnet element 321 and superconductor element 323, and a convey member comprising the second member 310 and magnetic material 322. In addition, the magnet element 321, magnetic material 322 and superconductor element 323 should be considered not as structural elements of the levitating and guide force generating unit 320 but as structural elements of the support member and convey member. It is necessary that the superconductor element 323 bring about magnetic flux pinning effect in the superconducting state. It is desirable that the magnetic material 322 be a ferromagnetic material such as iron.

In the above basic structure of the present invention, the predetermined magnetic fluxes passing through the inside of the superconductor element 323 are pinned within the superconductor element 323. A gap length 330 between the magnetic material 322 mounted on the second member 310 and the superconductor element 323 is increased and decreased. Even if the magnetic field due to the magnet element 321 varies, the magnetic fluxes pinned by the magnetic flux pinning effect within the superconductor element 323 are always kept in the invariable state. At this time, such an electric current as to keep the pinned magnetic fluxes in the invariable state within the superconductor element 323 is induced, and consequently a magnetic field due to the induced current occurs outside the superconductor element 323.

When the gap length 330 is decreased, the magnetic field due to the induced current acts to weaken the magnetic field due to the magnet element 321. Thus, the intensity of the magnetic fluxes between the superconductor element 323 and the magnetic material 322 becomes substantially constant. Similarly, when the gap length 330 increases, the magnetic field due to the induced current acts to intensify the magnetic field due to the magnet element 321. Thus, the intensity of magnetic fluxes between the superconductor element 323 and the magnetic material 322 becomes substantially constant.

An electromagnetic attraction force acting on the first member 300 is divided into a levitating force and a guide force. The intensity of magnetic fluxes of the electromagnetic attraction force between the superconductor element 323 and the magnetic material 322 is substantially constant. Thus, the levitating force and guide force vary in accordance with the inclination of the magnetic fluxes between the superconductor element 323 and the magnetic material 322. Accordingly, if the positional relationship between the inclination of the magnetic fluxes pinned by the superconductor element 323 and the position of the magnetic material 322 is appropriately determined, the levitating force increases as the second member 310 moves downwards and it decreases as the second member 310 moves upwards. In addition, even in the case where the second member 310 moves horizontally, the guiding force functions as a restoring force and therefore the second member 310 can be stably guided.

As has been described above, special control with many sensors is not required, and the second member 310 can be stably levitated by magnetic force. In addition, even if an external force is applied to the second member 310, the second member 310 can be stably supported in the non-contact state.

Figure 2:
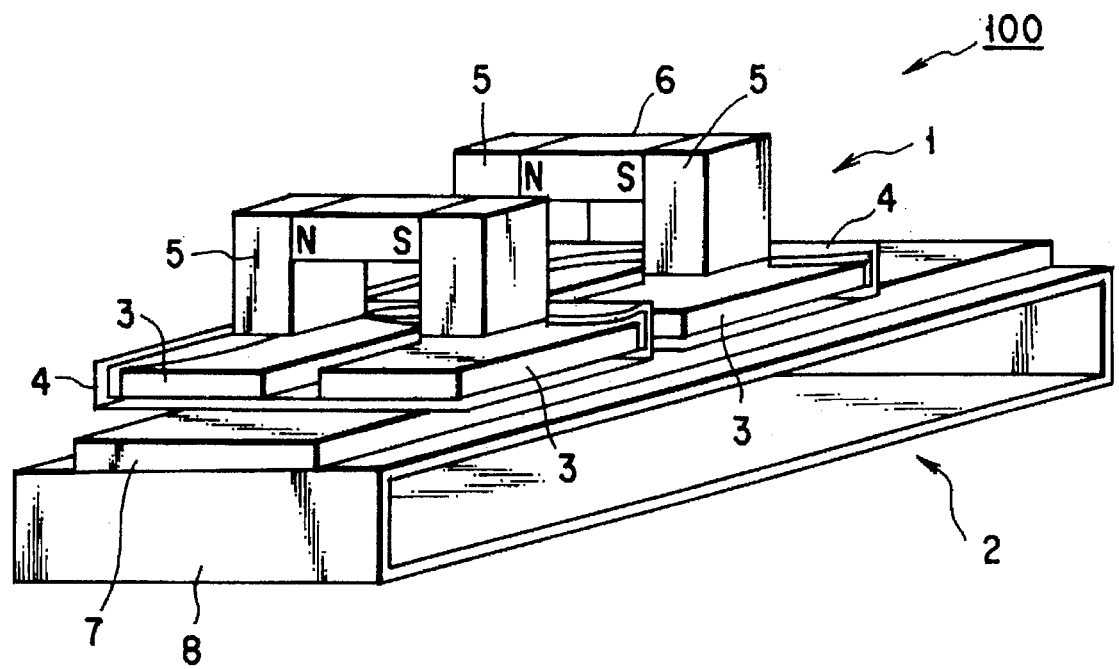
FIG. 2 is a schematic perspective view showing the system of the present invention.
Figure 3:
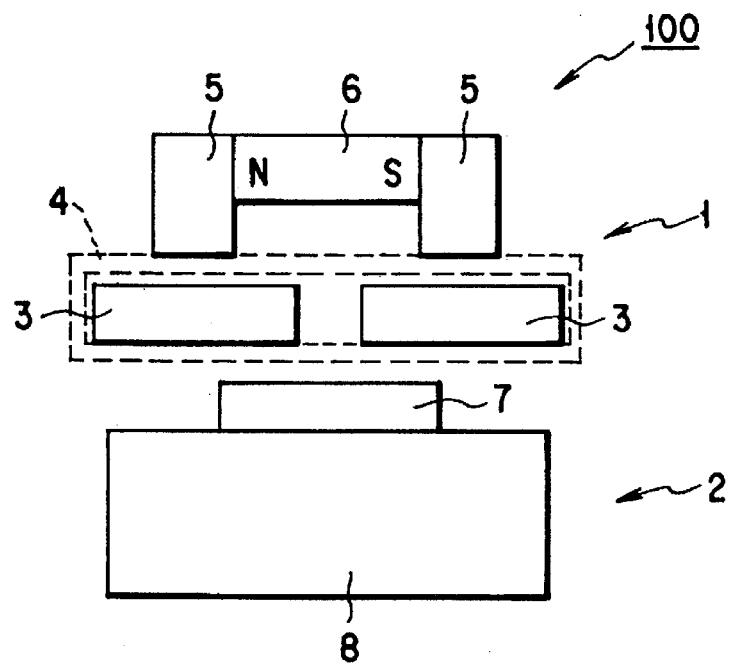
FIG. 3 is a cross-sectional view of a convey plane and a convey path, taken in a direction perpendicular to the convey direction of the apparatus shown in FIG. 2.

Preferred embodiments according to the principle of the present invention will now be described with reference to the accompanying drawings. As shown in FIGS. 2 and 3, a system 100 according to an embodiment of the invention comprises a support device 1 constituting the convey path and a convey member 2 supported by the support device 1 therebelow in the non-contact state. In the system 100, the support device 1 includes the first member 300, magnet element 321 and superconductor element 323 as shown in FIG. 1, and the convey member 2 includes the second member 310 and magnetic material 322 as shown in FIG. 1. When the superconductor material 3 is cooled by a specific material such as liquid nitrogen $N_2$, the phase of the material 3 changes from the normal conduction state to the superconduction state.

The support device 1 has a support member (not shown), and a permanent magnet 6 is fixed on the support member. A stainless-steel double-wall container 4 in which the superconductor material 3 is fixed is secured to the permanent magnet 6 via yokes 5. A high-temperature superconducting material is used as the superconductor material 3. The container 4 is filled with liquid nitrogen for setting the superconductor material 3 in the superconducting state. The convey member 2 includes a table 8 and an iron plate 7 or a magnetic body situated on the table 8. The iron plate 7 and container 4 are opposed to each other with a predetermined gap.

The support device 1 is situated within a convey space which is a super-clean space defined in, e.g. a clean room, with an obstacle voided. The convey member 2 is conveyed below the support device 1 and moved to a desired point.

In brief, the system 100 for levitating and guiding the object by magnetic force, according to the present invention, comprises the support member (not shown), the convey member 2 opposed to the support member, the permanent magnet 6 for generating magnetic fluxes for producing a predetermined magnetic field, the iron plate 7, situated on the convey member 2, for receiving the magnetic fluxes generated from the permanent magnet 6, and the container 4, mounted on the support member between the permanent magnet 6 and iron plate 7, for containing the superconductor material 3 for trapping the magnetic fluxes generated from the permanent magnet 6 at the transition time from the normal conduction state to the superconduction state and producing the levitating and guide force on the basis of the trapped magnetic fluxes.

The procedures and principle for obtaining the levitating and guide force by the apparatus of the present invention will now be described with reference to FIG. 4. According to this embodiment, the convey member 2 is supported below the apparatus in the non-contact state. In the following description, such non-contact support below the apparatus is referred to as "levitation."

FIG. 4A shows main magnetic fluxes generated by the permanent magnet 6 of the support device 1 when the superconductor material 3 has not come to the superconducting state. In this case, the magnetic fluxes pass through the superconductor material 3 with a predetermined inclination. If liquid nitrogen $N_2$ is filled in the container 4, the superconductor material 3 is cooled and the normal conduction state is changed to the superconduction state. At the time of phase transition, those of the magnetic fluxes which pass through the inside of the superconduction material 3 are trapped, as indicated by thick lines in FIG. 4B. The phenomenon wherein the magnetic fluxes are trapped in the superconductor material at the time of phase transition is generally called "magnetic pinning effect." When a magnetic body is situated within the magnetic field produced by the permanent magnet 6, the state of the magnetic field changes. In accordance with the change of state, the magnetic fluxes outside the container 4 vary. However, if the magnetic fluxes of the magnetic field generated by the permanent magnet 6 are pinned by the superconduction material 3, the pinned magnetic fluxes are always kept at the constant state. Since the pinning effect is made use of in the present invention, it is desirable to use the superconductor material 3 having high pinning effect, such as yttrium-based oxide superconductor material.

An electric current is induced within the superconductor material 3 so as to keep the pinned magnetic fluxes in the invariable state. Thus, a magnetic field due to the induced current occurs outside the superconductor material 3. That is, according to the system 100 having the above structure, the electromagnetic attraction force which is the sum of the levitating force and guide force acting on the convey member 2 can be kept at a substantially constant level as long as the gap length between the iron plate 7 and the container 4 is within a predetermined range.

If the superconductor material 3 in which the magnetic fluxes are pinned, as shown in FIG. 4B, is approached to the iron plate 7, as shown in FIG. 4C, the magnetic fluxes passing through the air tend to pass through the iron plate 7 or a high magnetic-permeability material. Thus, the magnetic field produced by the permanent magnet 6 varies. In this case, since the magnetic fluxes within the superconductor material 3 are trapped by the pinning effect, the magnetic field produced by the induced current functions to weaken the magnetic field produced by the permanent magnet 6. Accordingly, the intensity of the magnetic field produced by the magnetic fluxes produced in the gap between the iron plate 7 and superconductor material 3 does not vary, but only the inclination of the magnetic fluxes (i.e. passage of magnetic fluxes) varies. The guide force and levitating force acting on the convey member 2, depending on the inclination of the magnetic fluxes, is produced at both sides of a lower portion of the support device 1.

If the distance between the superconductor material 3 of the support device 1 and iron plate 7 is further decreased, as shown in FIG. 4D, the inclination of the magnetic fluxes becomes closer to the horizontal direction, as compared to the state shown in FIG. 4B. If the inclination of the magnetic fluxes is varied in this manner, the guide force acting on the iron plate 7 increases and the levitating force decreases, as compared to the state shown in FIG. 4B. In other words, if the gap length between the support device 1 and the iron plate 7 increases, the levitating force increases; if the gap length decreases, the levitating force decreases.

Accordingly, the weight of the convey member 2 for ensuring stable levitation of the convey member 2 must be greater than the levitating force at the time the support device 1 is put in contact with the iron plate 7 and be less than the levitating force at the time the support device 1 is opposed to the iron plate 7 with a predetermined gap.

On the other hand, when the convey member 2 is moved to the right relative to the support device 1, as shown in FIG. 4E, the inclination of the magnetic fluxes decreases at the upper right portion of the iron plate 7 and increases at the upper left portion of the iron plate 7. Furthermore, when the convey member 2 is moved to the left relative to the support device 1, as shown in FIG. 4F, the inclination of the magnetic fluxes decreases at the upper left portion of the iron plate 7 and increases at the upper right portion of the iron plate 7. Thus, even if the convey member 2 is moved either to the right or left, the restoring force for making uniform the right and left magnetic fluxes of the iron plate 7 acts on the iron plate 7. Thereby, the stable levitation state of the convey member 2 is maintained.

Figure 5:
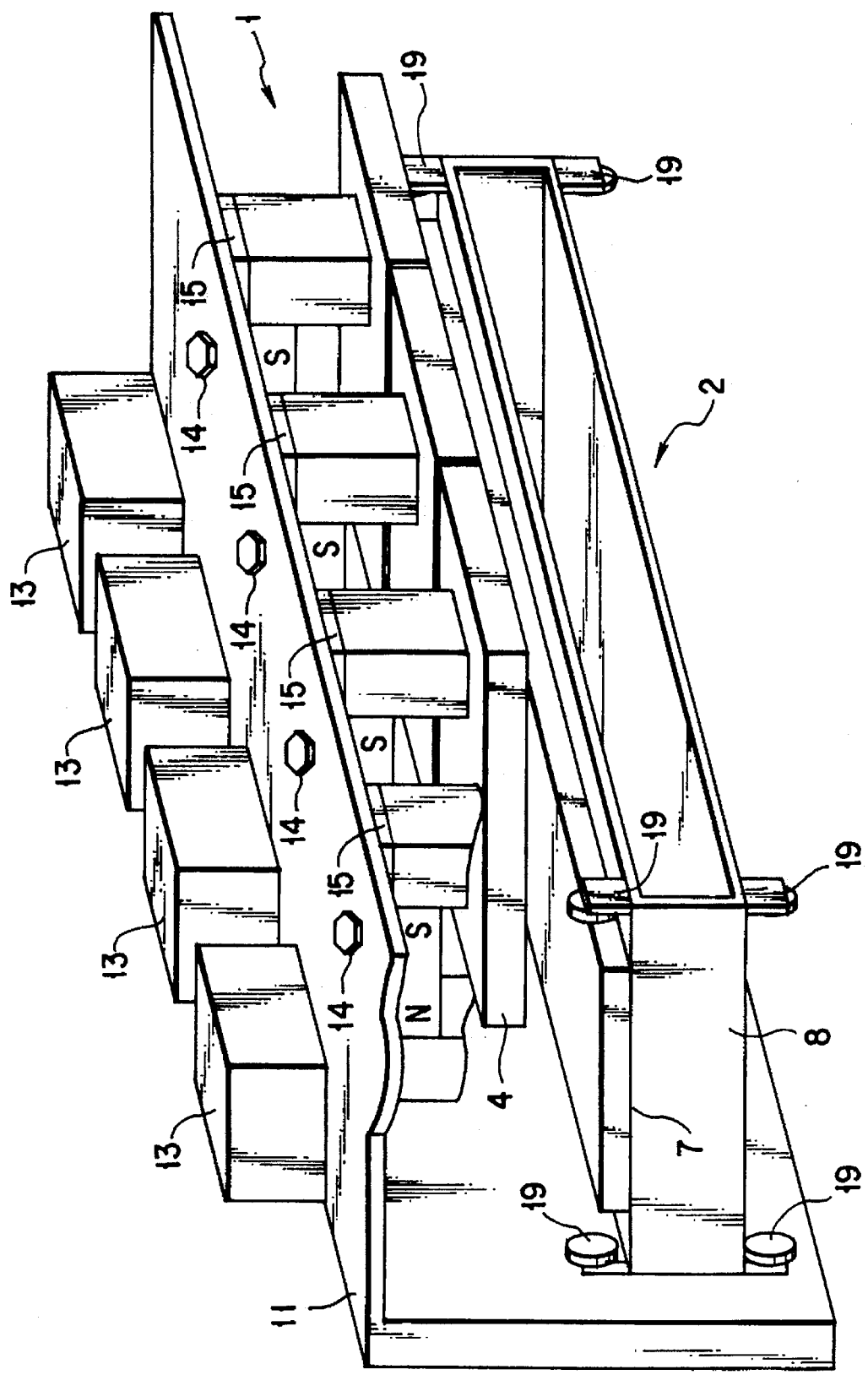
FIG. 5 is a perspective view showing an embodiment of the system of the present invention.
Figure 6:
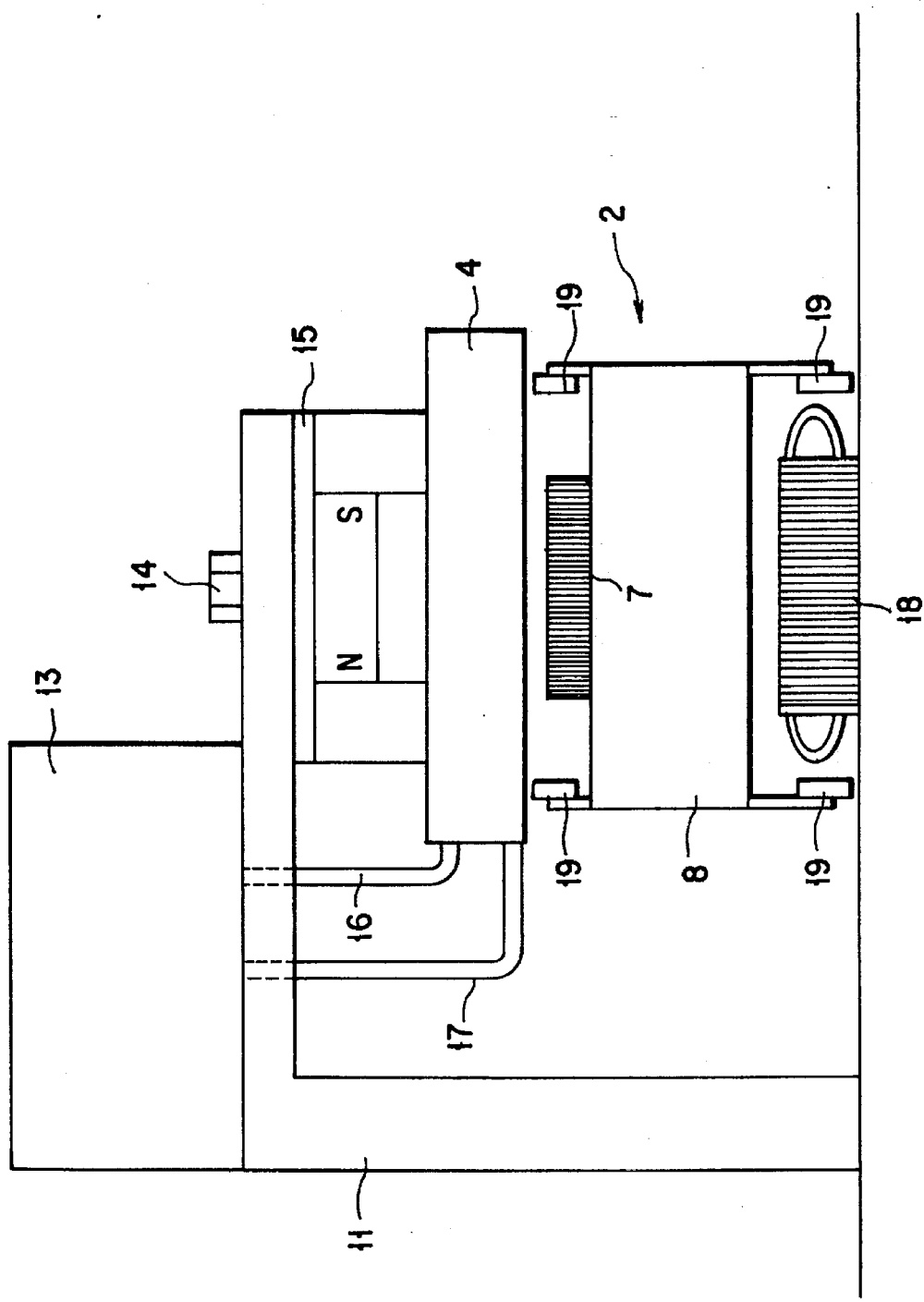
FIG. 6 is a cross-sectional view of a convey plane and a convey path, taken in a direction perpendicular to the convey direction of the apparatus shown in FIG. 5.
Figure 7:
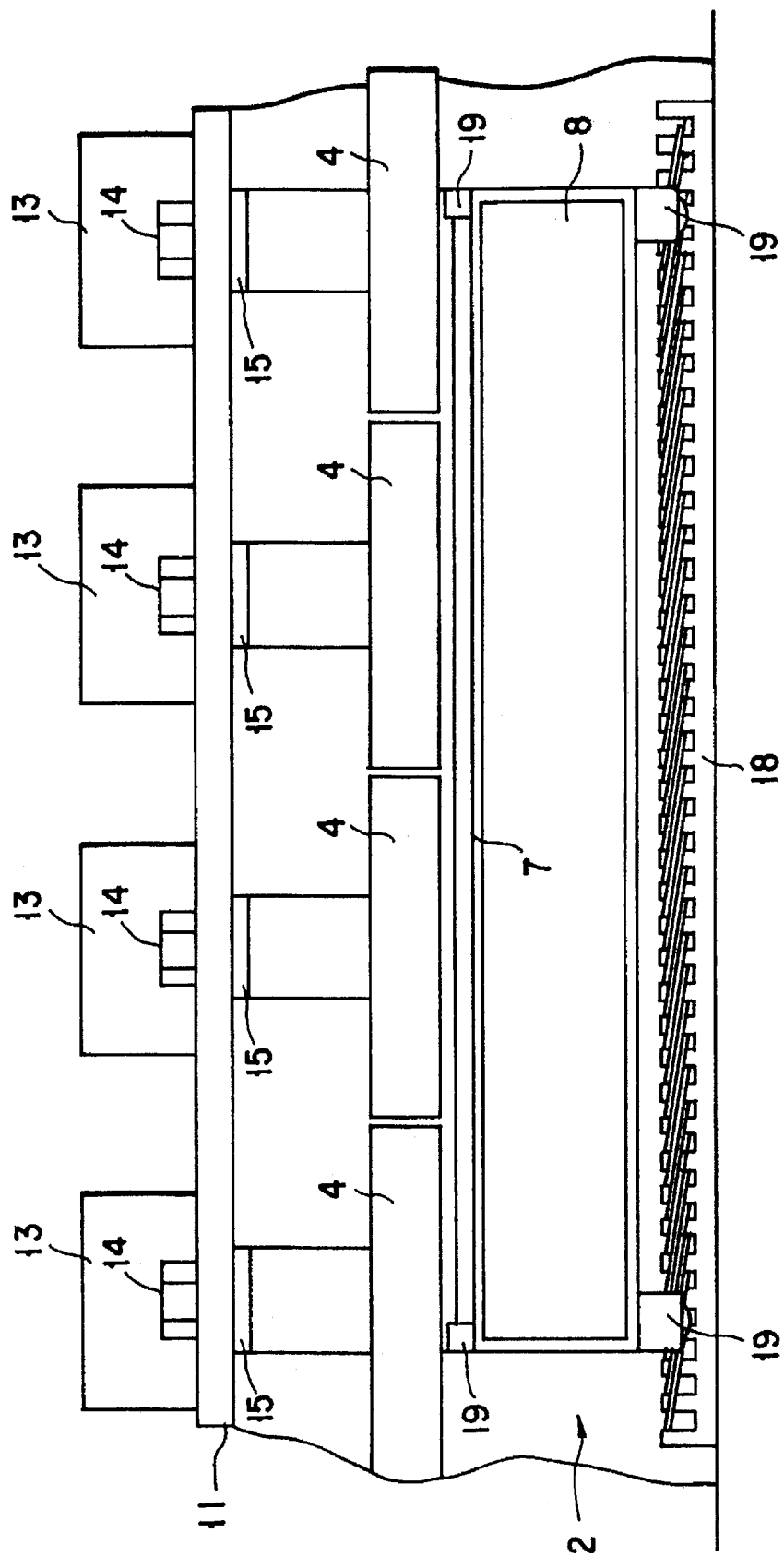
FIG. 7 is a cross-sectional view of a convey plane and a convey path, taken in the convey direction of the apparatus shown in FIG. 5.

Referring to FIGS. 5 to 7, an embodiment of the system of the present invention will now be described. In the following embodiments, the structural elements mentioned in the preceding embodiment are denoted by the same reference numerals and the descriptions thereof are omitted.

As is shown in FIGS. 5 to 7, a track frame 11 is provided in a space within, e.g. a clean room. The track frame 11 has an inverted-L cross section. A plurality of support devices 1 are provided on the lower surface of an upper wall of the rail frame 11. A plurality of liquefiers 13 connected to a power supply (not shown) are provided on the upper surface of the upper wall of the track frame 11. These support devices 1 are attached to the track frame 11 by using bolts 14 and seats 15.

Each liquefier 13 is connected to a container 4 of the support device 1 via two heat-insulated pipes 16 and 17. The gas-phase nitrogen in the container 4 is led to the liquefier 13 through the pipe 16. After the nitrogen is liquefied in the liquefier 13, it is returned to the container 4 via the pipe 17.

The convey member 2 which can be run along the support device 1 is situated blow the support device 1. A stator 18 which is an element of a linear induction motor is disposed on the upper surface of the floor below the support device 1, with a predetermined distance between itself and another along the support device 1.

The convey member 2 comprises a box-shaped non-magnetic table 8, and a flat iron plate 7 fixed on the upper surface of the table 8 so as to face the support device 1. Wheels 19 are attached to the four corners of the upper and lower surfaces of the table 8. When the superconductor material 3 has changed from the superconduction state to the normal conduction state, the wheels 19 function to bring the convey member 2 into contact with the floor and the lower surface of the container 4 of the support device 1, and to vertically support the convey member 2. These wheels 19 are regarded as auxiliary members for smoothing the convey operation of the convey member 2. These auxiliary members can be provided on the convey member 2 and/or the support member. The table 8 serves also as a secondary electrically conductive plate which is a structural element of the above-mentioned linear induction motor. The table 8 is situated such that a slight gap is provided between itself and the stator 18 at the time of the operation of the apparatus (at the time of conveyance).

Next, the operation of the embodiment having the above structure will now be described. When the apparatus is in the halt state, the convey member 2 is disengaged from the support device 1 which constitutes the track, and situated off the track. In order to activate the apparatus, the liquefier 13 is first operated. Then, liquid nitrogen is filled in the container 4 via the heat-insulated pipe 17, and the superconduction material 3 changes its phase from the normal conduction state to the superconduction state. The magnetic fluxes produced by the permanent magnet 6 are pinned within the superconduction material 3. Once the magnetic fluxes have been pinned, the electromagnetic attraction force is always kept at a constant level in the vicinity of the lower surface of the superconduction material 3. If the convey member 2 is situated within the magnetic field, the convey member 2 is supported in a perfect non-contact state such that the electromagnetic attraction force acting on the convey member 2, i.e. the sum of the guide force and levitating force, becomes constant. The convey member 2 produces a restoring force against a variation in vertical and side-to-side displacement, on the basis of electromagnetic attraction force.

The convey member 2 is situated above the linear induction motor. When the stator 18 is activated, the table 8 receives an electromagnetic force from the stafor 18. By this electromagnetic force, the convey member 2 starts to move along the support device 1 in the magnetic levitation state. Before the convey member 2 stops completely due to influence of air resistance, etc., it is driven once again by the stator 18 and can continuously be moved along the support device 1. The movement of the convey member 2 is continued to a desired location.

In this way, the convey member 2 can stably be moved to a desired location in the non-contact state.

The total weight of the convey member 2 is limited so that the convey member 2 which is loaded with an article can be moved. Specifically, the total weight of the convey member 2 is set to be greater than the levitating force at the time the support device 1 is put in contact with the iron plate 7 and less than the levitating force at the time the support device 1 is opposed to the iron plate 7 with a predetermined gap length.

The arrangement gap for the support device 1 is set within the range within which an electromagnetic force capable of stably supporting the total weight of the convey member 2 is obtained.

Other embodiments of the present invention will now be described with reference to FIGS. 8 to 14.

Figure 8:
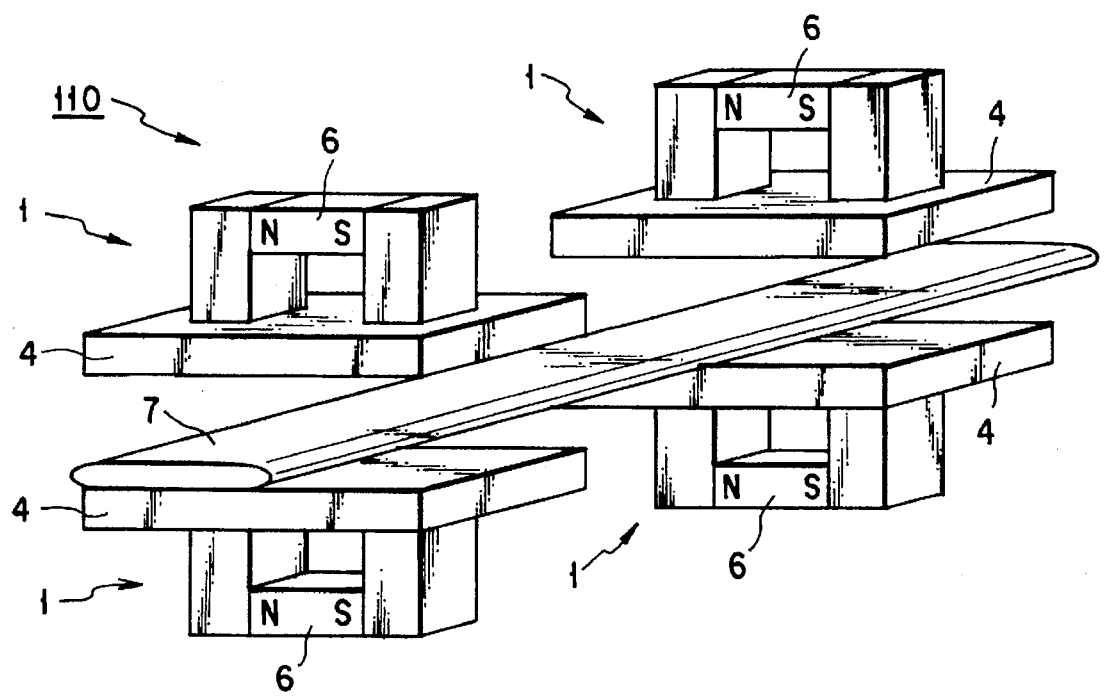
FIGS. 8 to 13 are perspective views showing other embodiments of the system of the invention.

In a system 110 shown in FIG. 8, a number of pairs of support devices 1 are arranged vertically on both sides of the iron plate 7 such that one support device 1 of each pair faces the other support device 1. The iron plate 7 itself is used as a levitation convey member. Specifically, in each pair of support devices 1, a pair of containers 4 and a pair of permanent magnets 6 are arranged so as to sandwich the iron plate 7. The pairs of support devices 1 are arranged in the longitudinal direction of the iron plate 7. It is considered that a number of pairs of levitating and guide force generating units are arranged in the longitudinal direction of the iron plate 7, each pair of force generating units comprising first and second permanent magnets 6 for generating first and second magnetic fluxes in opposite directions to produce first and second magnetic fields; an iron plate 7 of a magnetic material, situated at such a predetermined position as to be able to sense first and second magnetic fields, for receiving the first and second magnetic fluxes generated by the first and second permanent magnets; and first and second superconductor materials, situated between the first and second permanent magnets 6 and the iron plate 7, for trapping the first and second magnetic fluxes generated by the first and second permanent magnets 6 at the transition time from the normal conduction state to the superconduction state.

Accordingly to the system 100 having the above structure, electromagnetic attraction forces act on the iron plate 7 vertically and horizontally and therefore the levitation stability of the iron plate 7 is remarkably enhanced. With this structure, an object can be conveyed even in the state of non-gravitation.

In this structure, the iron plate 7 having an oval cross-section is employed. In this case, magnetic fluxes enter the surface of the iron plate substantially perpendicularly, and the electromagnetic attraction force can be used more efficiently. Of course, the cross-sectional shape of the iron plate 7 is not limited to this and other shapes can be adopted.

Figure 9:
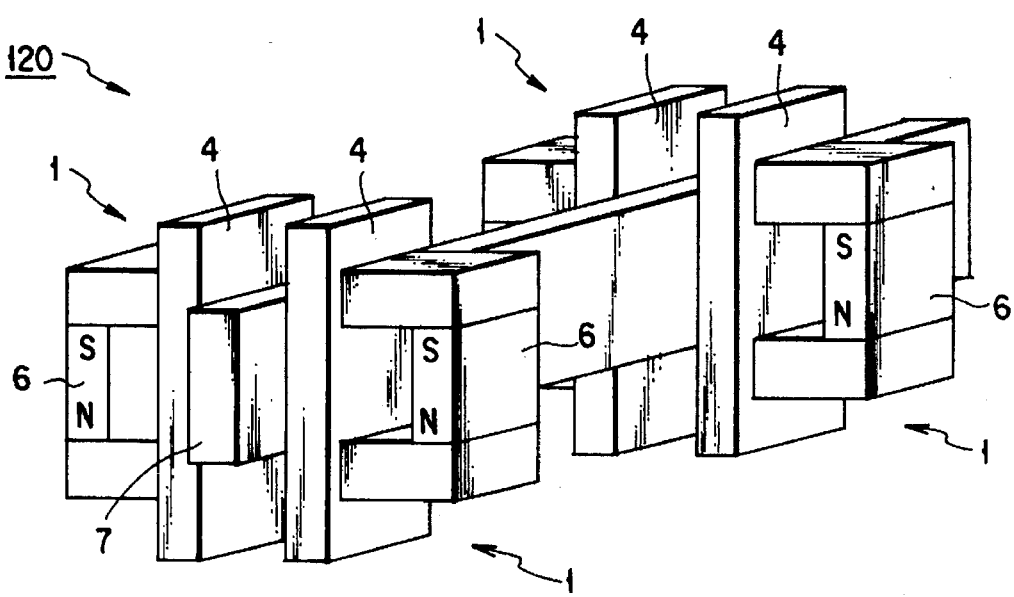
Figure 10:
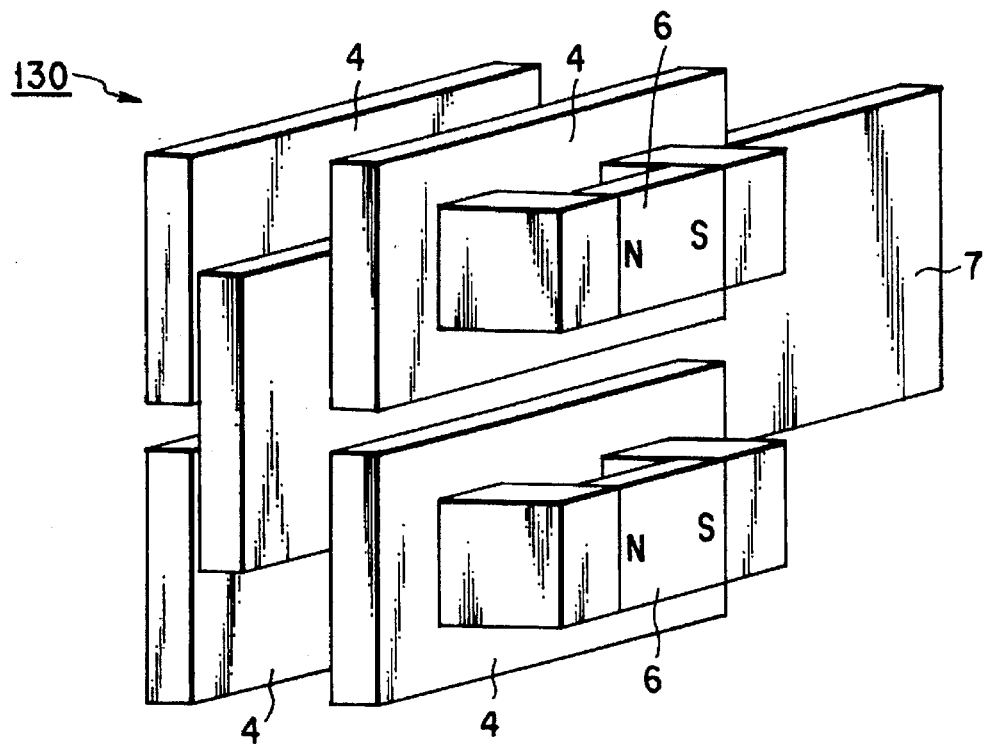

FIGS. 9 and 10 show systems 120 and 130 wherein support devices 1 are arranged horizontally to support the convey member 2 in the non-contact state. According to this construction, the relationship between the guide force and levitating force acting on the convey member is reversed, as compared to the preceding embodiment. Therefore, the degree of freedom of apparatus design can be increased.

According to the system 130 shown in FIG. 10, the iron plate 7 is supported in the non-contact state by using four support devices 1, so that the magnetic poles of each permanent magnet 6 are arranged in the convey direction on the upper and lower sides of the iron plate 7. In this case, a greater vertical guide force can be obtained, as compared to the system 120 shown in FIG. 9. Thus, a heavier object can be conveyed.

Figure 11:
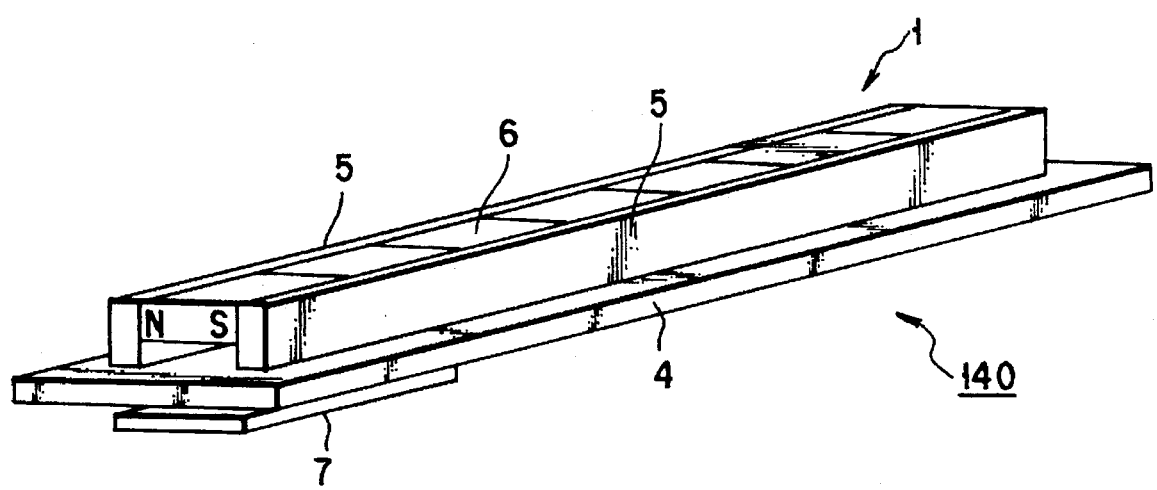

FIG. 11 shows a system 140 having a support device 1. The support device 1 is constituted such that a container 4 is provided for containing a flat superconductor material elongated in the convey direction of the iron plate 7 which is a levitation object, yokes 5 having substantially the same length are fixed on both sides of an upper portion of the container 4, and a plurality of permanent magnets 6 are arranged between the yokes 5. With this structure, the superconduction material 3 has a flat shape and each gap between the permanent magnets 6 is very small. Thus, the electromagnetic force acting on the iron plate 7 is substantially constant in the convey direction, and this embodiment is very advantageous when it is desired to reduce as much as possible vertical vibration of the moving iron plate 7.

Figures 12, 13:
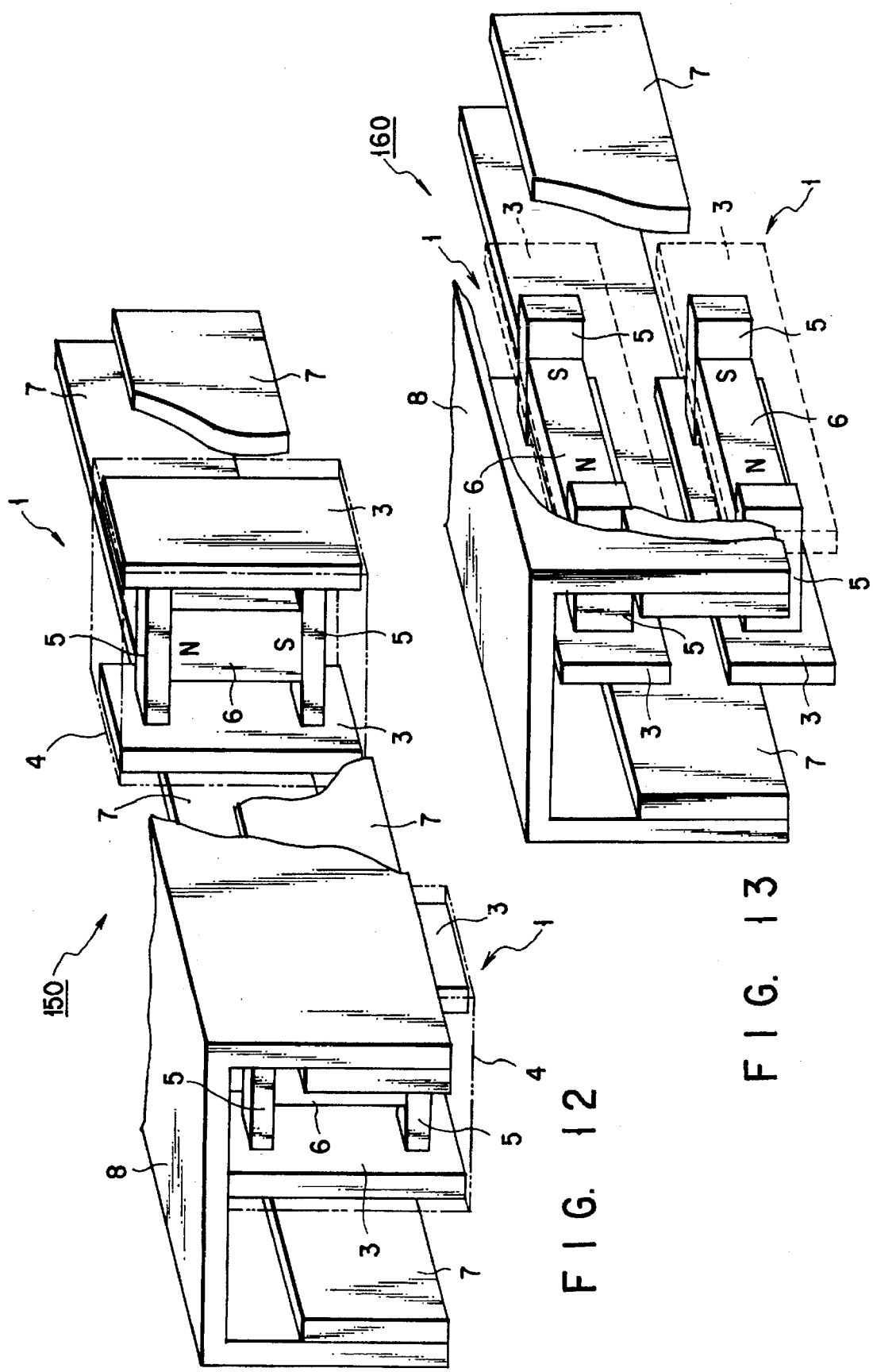

In a system 150 shown in FIG. 12, permanent magnets 6 are arranged such that the direction of poles is substantially perpendicular to the convey direction, the yokes 5 are fixed to both poles of each permanent magnet 6, and two plate-like superconductor materials 3 are arranged on both sides of a tip portion of the yokes. These elements are all contained in the container 4, thus constituting the support device 1. The container 4 is arranged along the convey path, thus constituting the track. Two iron plates 7 facing each other with the superconduction material 3 interposed are fixed on the inside walls of a table 8 having a bracket (]) shape, and thereby the convey member 2 is constituted.

On the other hand, in a system 160 shown in FIG. 13, yokes 5 are fixed at both poles of permanent magnets 6 which are arranged substantially in parallel to the convey direction. Two plate-like superconductor materials 3 are arranged at both tip end portions of the yokes 5. All these elements 3 are housed in a container (not shown), like the system shown in FIG. 12, thus constituting the support device 1. The support device 1 is arranged along the convey path, thus constituting the track. Two iron plates 7 facing each other with the superconduction material 3 interposed are fixed on the inside walls of a table 8 having a bracket (]) shape, and thereby the convey member 2 is constituted.

The systems 150 and 160 having the above structures can bring about the same advantages as the embodiments shown in FIGS. 9 and 10.

Regarding the systems of the present invention, the positional relationship between the permanent magnets and iron plates (magnetic materials) which are main structural elements is not limited to the above embodiments, and other modes of positional relationship shown in FIGS. 14A to 14H can be covered by the invention. FIGS. 14A to 14H are cross-sectional views showing the convey planes and convey paths of the systems, along in a direction perpendicular to the convey direction.

Figure 14A:
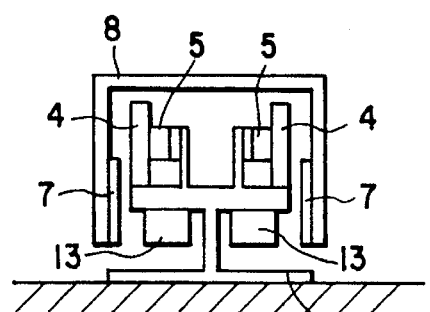
FIGS. 14A to 14H are cross-sectional views of convey planes and convey paths according to various modifications of the system of the invention.
Figure 14B:
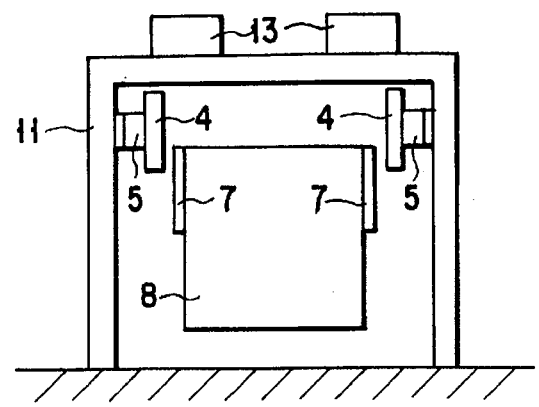
Figure 14C:
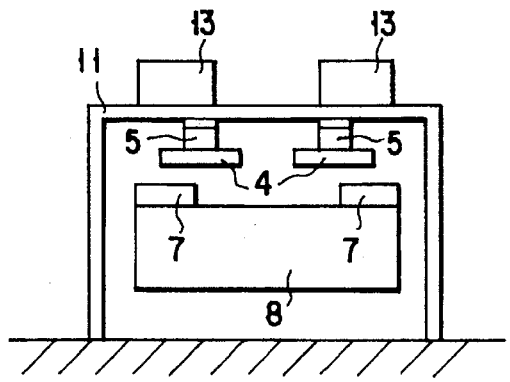
Figure 14D:
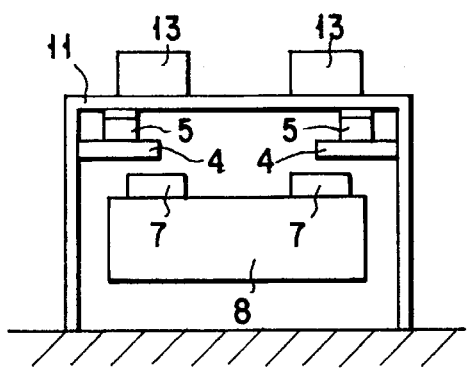
Figure 14E:
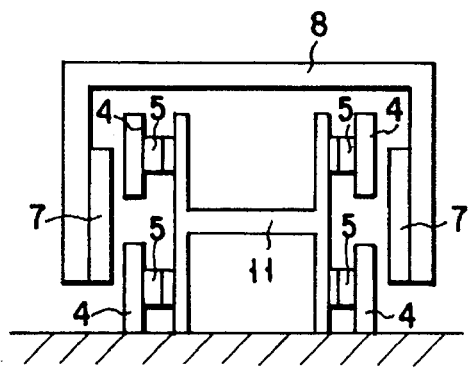
Figure 14F:
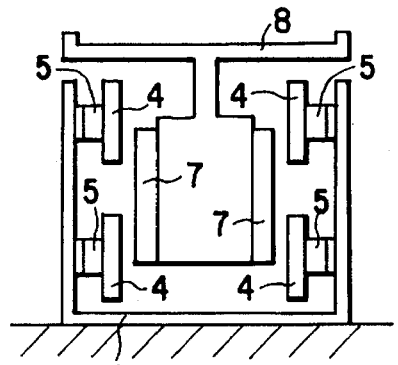
Figure 14G:
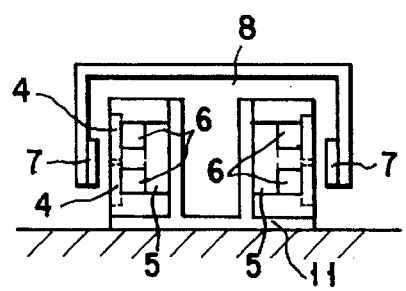
Figure 14H:
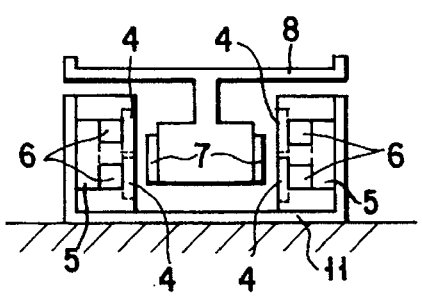

FIG. 14A shows a system wherein a support device is situated on a track frame 11 such that the direction of poles of permanent magnets 6 (behind the yokes 5) opposed to upper portions of the inside parts of two iron plates 7 is substantially parallel to the convey direction. FIG. 14B shows a system wherein a support device is situated such that the direction of poles of permanent magnets 6 opposed to upper portions of the outside parts of two iron plates 7 is substantially parallel to the convey direction. FIG. 14C shows a system wherein a support device is situated such that the direction of poles of permanent magnets 6 opposed to inside parts of two iron plates 7 is substantially parallel to the convey direction. FIG. 14D shows a system wherein a support device is situated such that the direction of poles of permanent magnets 6 opposed to outside parts of two iron plates 7 is substantially parallel to the convey direction. FIG. 14E shows a system wherein a support device is situated on the track frame 11 such that the direction of poles of permanent magnets 6 opposed to upper and lower portions of the inside parts of two iron plates 7 is substantially parallel to the convey direction. FIG. 14F shows a system wherein a support device is situated on the track frame 11 such that the direction of poles of permanent magnets 6 opposed to upper and lower portions of the outside parts of two iron plates 7 is substantially parallel to the convey direction. FIG. 14G shows a system wherein a support device is situated on the track frame 11 such that the direction of poles of permanent magnets 6 opposed to the inside parts of two iron plates 7 is substantially perpendicular to the convey direction. FIG. 14H shows a system wherein a support device is situated on the track frame 11 such that the direction of poles of permanent magnets 6 opposed to the outside parts of two iron plates 7 is substantially perpendicular to the convey direction.

In the above embodiments, the iron plate of magnetic material is situated on the convey member, and the superconductor material is situated on the support device.

However, the system of the invention may adopt a structure wherein the superconduction material is provided on the convey member, and the iron plate on the support device. Embodiments of such systems will now be described with reference to FIGS. 15 to 24.

As is shown in FIGS. 15 and 16, a system 200 comprises an iron plate 7 constituting the convey path and a convey member 22 supported below the iron plate 7 in the perfect non-contact state.

The convey member 22 includes a stainless-steel vacuum double-wall container 4 in which superconductor materials 3 are fixed. The container 4 is fixed to a permanent magnet 6 via yokes 5. A high-temperature superconductor material is used as the superconductor material 3, and the vacuum double-wall container 4 is designed to be filled with liquid nitrogen. A table 8 is fixed to the convey member 22.

On the other hand, the unit including the iron plate 7 constitutes a support device 21, and the iron plate 7 and vacuum double-wall container 4 are opposed to each other with a predetermined gap provided therebetween.

In brief, the system 200 for levitating and guiding the object by magnetic force, according to the present invention, comprises the convey member 22, the support member 2 (not shown) opposed to the convey member 22, the permanent magnet 6 for generating magnetic fluxes for producing a predetermined magnetic field, the iron plate 7, situated on the support member 2, for receiving the magnetic fluxes generated from the permanent magnet 6, and the container 4, mounted on the convey member between the permanent magnet 6 and iron plate 7, for containing the superconduction material 3 for trapping the magnetic fluxes generated from the permanent magnet 6 at the transition time from the normal conduction state to the superconduction state and producing the levitating and guide force on the basis of the trapped magnetic fluxes.

In the system 200 having the above structure, the iron plate 7 is situated within a convey space which is a super-clean space in, e.g. a clean room, with an obstacle avoided. On the basis of the same principle as in FIGS. 5 to 7, the convey member 22 can be levitated and conveyed.

Figure 17:
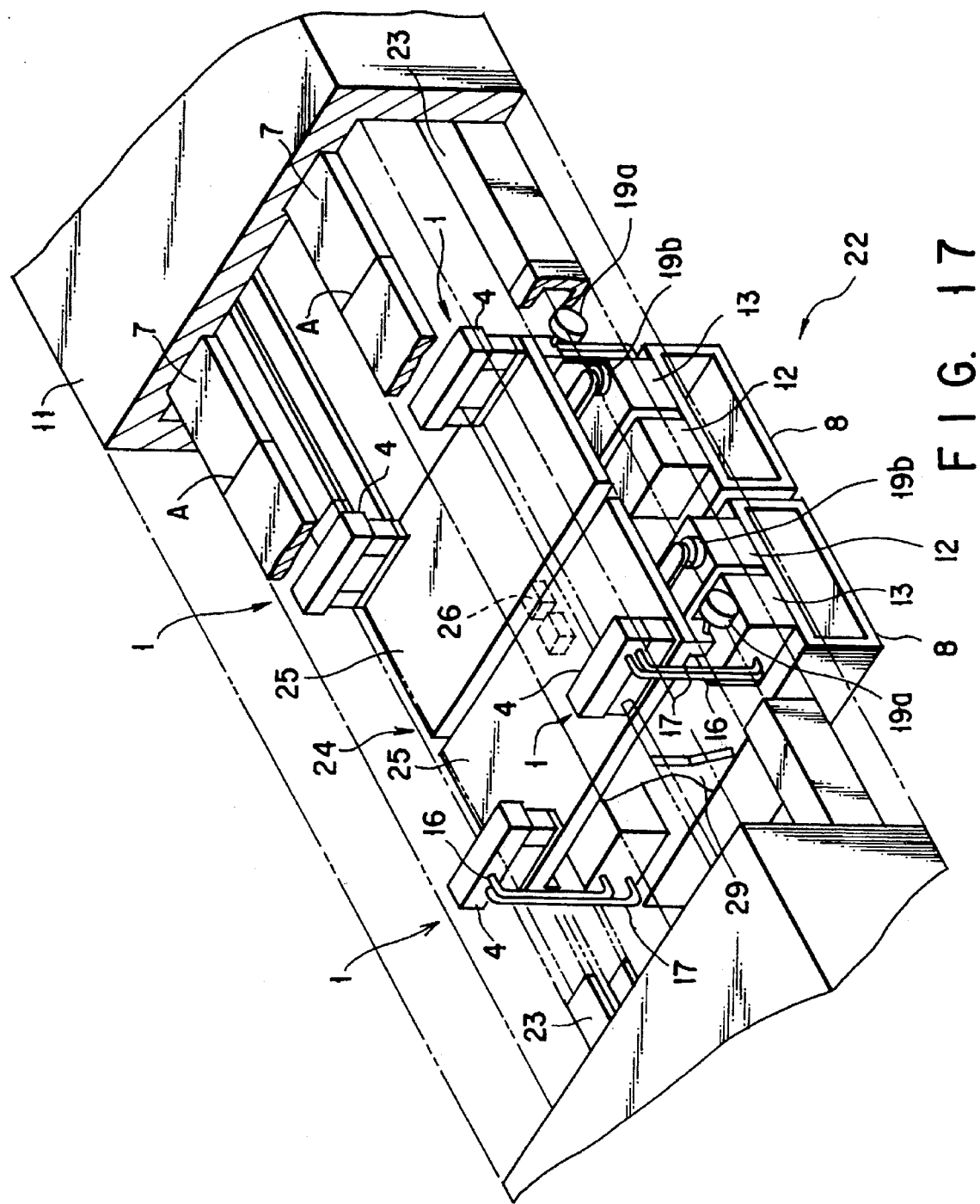
FIG. 17 is a perspective view showing another embodiment of the system of the present invention.
Figure 18:
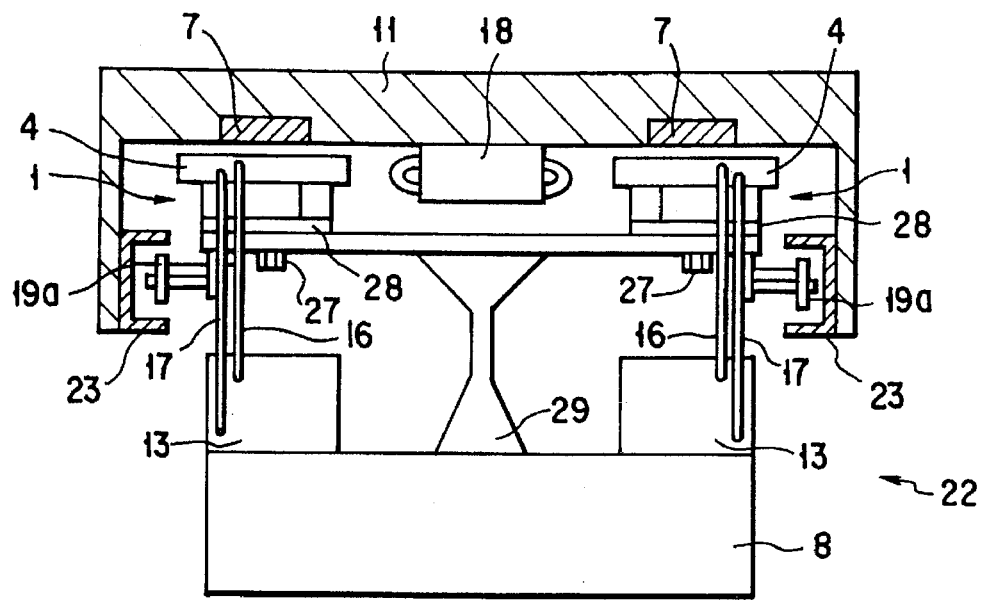
FIG. 18 is a cross-sectional view of a convey plane and a convey path, taken in a direction perpendicular to the convey direction of the apparatus shown in FIG. 17.
Figure 19:
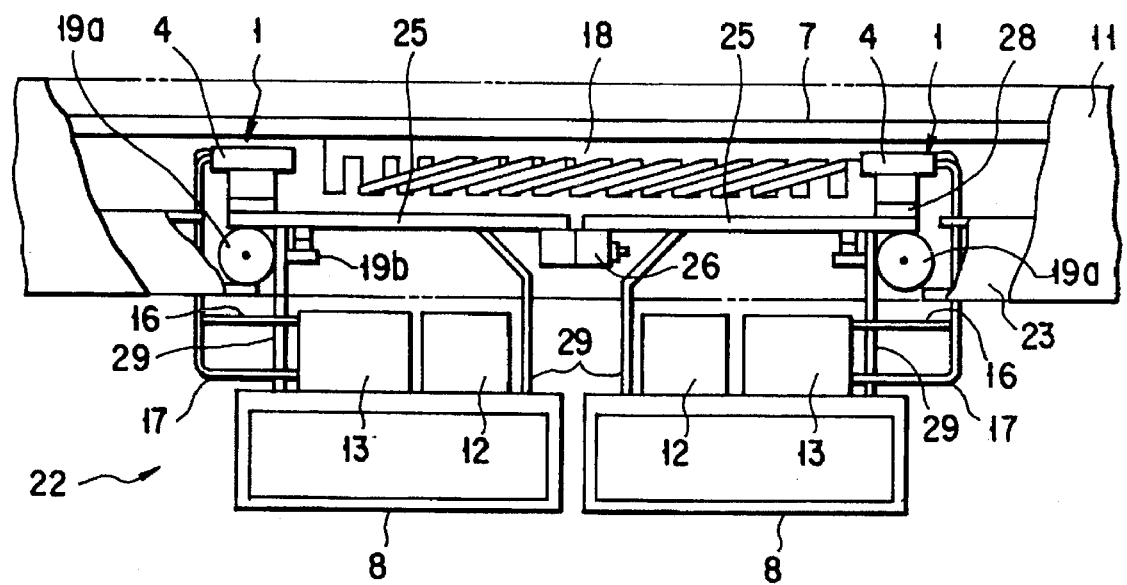
FIG. 19 is a cross-sectional view of a convey plane and a convey path, taken in the convey direction of the apparatus shown in FIG. 17.

Other embodiments of the system of the present invention will now be described with reference to FIGS. 17 to 19. As is shown in FIGS. 17 to 19, a track frame 11 arranged, e.g. within a clean room has an inverted U-cross section. Two parallel iron plates 7 serving as rails are attached to the lower surface of the top wall of the track frame 11. A pair of emergency guides 23 each having a square-bracket (]) cross section are attached on the inner surfaces of both side walls of the track frame 11, such that the open-side portions of the guides 23 face each other. A convey member 22 is situated below the iron plates 7 so as to be able to run along the iron plates 7.

A stator 18 of a linear induction motor is disposed on that portion of the lower surface of the top wall of the track frame 11, which is located between the iron plates 7. The stator 18 is located along the iron plates 7 with a predetermined distance between itself and another.

Each iron plate 7 has a divided structure for easily introducing the plates 7 into a clean room or the like. The divided parts of the plates 7 are coupled at portions A by a predetermined coupling process.

The structure of the convey member 22 will now be described. A flat base 24 is situated to face the bottom face of the iron plates 7. The base 24 comprises two division plates 25 juxtaposed in the direction of conveyance and a coupling structure 26 for coupling the division plates 25 rotatably in a plane perpendicular to the direction of conveyance. Support devices 1 (parts of the convey member 22 in this case) are mounted at four corners of the upper surface of the base 24. These support devices 1 are attached to the base 24 by using bolts 27 and base seats 28.

Two tables 8 for containing objects to be conveyed are attached to the bottom surfaces of the division plates 25 via a coupling member 29. Four liquefiers 13 for automatically supplying liquid nitrogen to the four support devices 1 and four power supplies 12 for supplying power to the liquefiers 13 are mounted on the two tables 8 (each table 8 is provided with two liquefiers 13 and two power supplies 12). Each liquefier 13 is connected to the container 4 of the corresponding support device 1 via heat-insulated pipes 16 and 17. The gasified nitrogen in the container 4 is led to the liquefier 13 via the pipe 16. After the nitrogen is liquefied by the liquefier 13, the liquid nitrogen is returned to the container 4 via the pipe 17.

The four corners of the bottom surface of the base 24 are provided with four wheels 19a and four wheels 19b. When the superconducting state of the superconducting material 3 is broken, the wheels 19a are brought into contact with the upper or lower inner walls of the emergency guides 23 to vertically support the convey member 22, and the wheels 19b are brought into contact with the side inner walls of the emergency guides 23 to horizontally support the convey member 22. These wheels 19a and 19b are auxiliary members for smoothly conveying the convey member 22. These auxiliary members may be provided on the convey member and/or the support member.

The base 24 can also serve as a secondary conductor plate which is a structural element of the aforementioned linear induction motor. While the convey operation is performed, the base 24 is situated such that a slight gap is provided between itself and the stator 18.

Next, the operation of the system having the above structure will now be described. While the system is in the off state, the convey member 22 is removed from the end of the track (not shown) and is placed outside the track. When the system is operated, the liquefiers 13 are turned on. Then, the containers 4 are filled with liquid nitrogen, and the conduction phase of the superconducting material 3 changes to the superconducting phase. Thus, the magnetic flux produced by the permanent magnet 6 is pinned within the superconducting material 3. When the magnetic flux has been pinned, the electromagnetic attraction force in the vicinity of the upper surface of the superconductor material 3 is constantly kept at a substantially fixed value. If the convey member 22 is situated in the track frame 11, the convey member 22 is supported in the perfect non-contact state, such that the electromagnetic attraction force acting between the iron plate 7 and, the convey member 22, i.e. the sum of the guide force and levitation force, becomes constant. By virtue of the electromagnetic attraction force, the convey member 22 has a restoring force against variations in vertical and horizontal displacement.

Suppose that the convey member 22 is situated Just below the stator 18 of the linear induction motor. When the stator 18 is energized, the base 24 receives an electromagnetic force from the stator 18 and the convey member 22 begins to move along the iron plates 7 while being magnetically levitated. Before the convey member 22 stops completely due to air resistance or the like, it is driven once again by another stator 18 which is situated within a distance over which the convey member 22 can move against air resistance or the like. Thus, the movement of the convey member 22 is continued to a target point.

If vibration of the convey member 22 occurs during conveyance due to an influence of stepped portions at joints A, magnetic fluxes between the superconductor material 3 and iron plates 7 vary through upper portions of the containers 4 which are made of a non-magnetic, highly electrical material, and eddy current occurs at the upper portions of the containers 4. Thus, the vibration energy of the convey member 22 is consumed and the vibration decreases quickly.

Accordingly, the convey member 22 can be stably moved to a target point in the non-contact state.

Systems 210 and 220 of the present invention will now be described with reference to FIGS. 20 and 21. In the system 210 shown in FIG. 20, permanent magnets 6 are arranged such that the direction of their poles are perpendicular to the direction of conveyance, and yokes 5 are attached to both poles of the permanent magnets 6. Two flat superconductor materials 3 are arranged on both sides of the yokes 5. These members are all housed in the containers 4 to constitute convey members 22. The convey members 22 are situated such that the superconductor materials 3 face the two iron plates 7 which form the track.

On the other hand, in the system 220 shown in FIG. 21, both poles of permanent magnets 6 are arranged substantially in parallel to the direction of conveyance, and yokes 5 are fixed to both poles of the permanent magnets 6. Two flat superconductor materials 3 are arranged on both sides of the yokes 5. Like the system shown in FIG. 20, these members are housed in containers (not shown) to constitute the convey members 22. The convey members 22 are situated such that the superconductor materials 3 face the two iron plates 7 which form the track.

The systems 210 and 220 having the above structures can bring about the same advantages as the embodiments shown in FIGS. 9, 10, 12 and 13.

Figure 22:
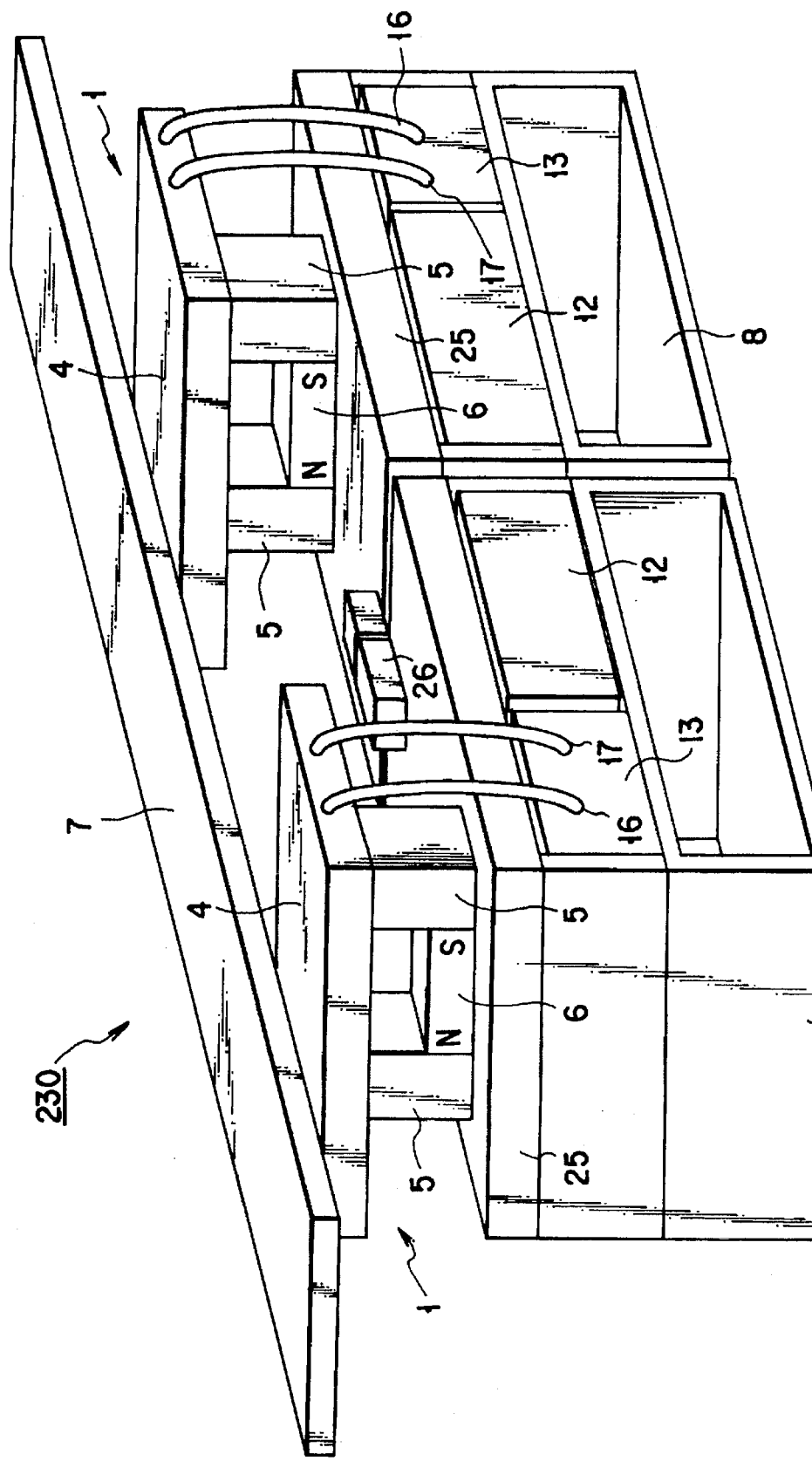

In the embodiment of the present invention, the support devices 1 are arranged at the four corners of the base 24 constituted by the rotatably coupled division plates 25. This arrangement, however, does not limit the structure of the convey member or the number of support devices employed. FIG. 22 shows a system 230 wherein a convey member 22 is formed by using two support devices 1. FIG. 23 shows a system 240 wherein six support devices 1 are arranged below both side portions of a yoke 7 such that the direction of the magnetic poles of permanent magnets 6 is substantially in parallel to the direction of conveyance, thereby constituting a convey member 22.

In FIG. 23, a base 25 is formed of a flat plate. However, as shown in FIG. 24 (plan view), a plurality of division plates 25 and coupling mechanisms 26 having a rotational shaft may be provided such that the plates 25 are rotatable relative to each other. This divisional structure is advantageous when the precision in flatness of the iron plate 7 is not high. Specifically, since the support devices 1 are vertically movable independently of each other during normal conveyance, a gap length corresponding to the weight of a load is maintained by virtue of the structure of FIG. 24. It is possible to make the best use of the range of a levitation gap length within which the electromagnetic attraction force acting on the support devices 1 is stably balanced with the weight of the load. Of course, all the support devices 1 may be formed vertically movable independently of each other using other mechanisms, e.g. coil springs and like that.

Even in the case where the superconductor material is provided on the convey member unit and the iron plate is provided on the support device unit, the positional relationship between the permanent magnets and iron plate (magnetic material), which are main structural elements, is not limited to the above embodiments, and modifications as shown in FIGS. 25A to 25H can be adopted.

Figure 25A:
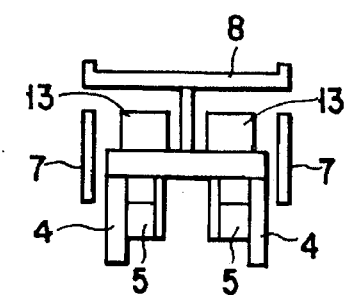
FIGS. 25A to 25H are cross-sectional views of convey planes and convey paths according to various modifications of the system of the invention.
Figure 25B:
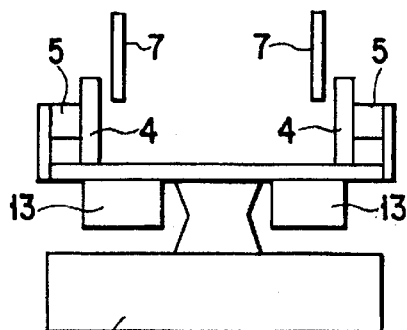
Figure 25C:
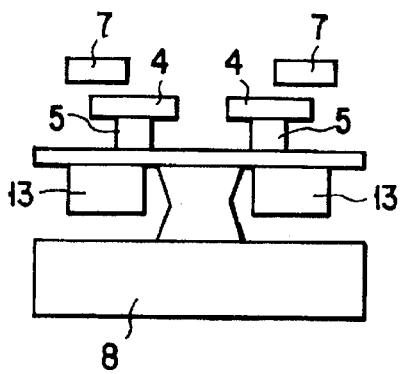
Figure 25D:
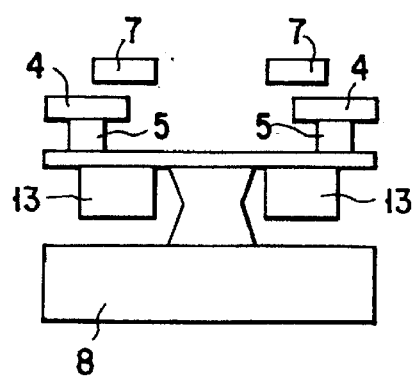
Figure 25E:
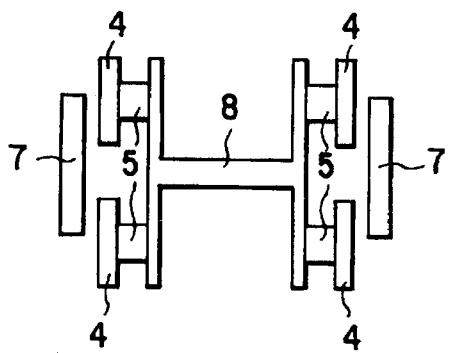
Figure 25F:
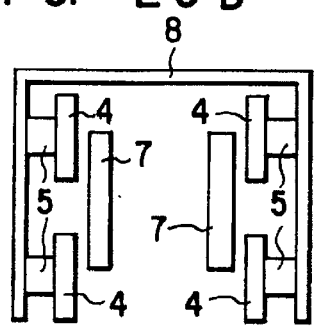
Figure 25G:
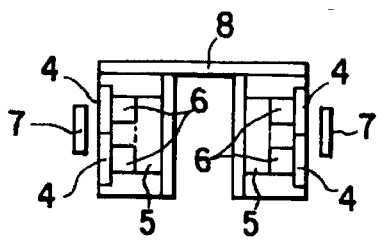
Figure 25H:
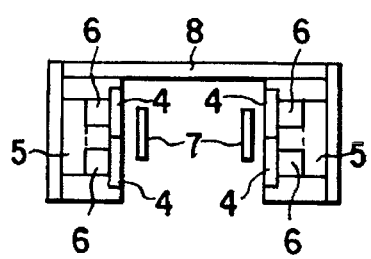

FIG. 25A shows a system wherein a support device is situated on a convey member 22 such that the direction of magnetic poles of permanent magnets 6 (behind yokes 5), which face inner lower portions of two iron plates 7, is substantially in parallel to the direction of conveyance. FIG. 25B shows a system wherein a support device is situated on a convey member 22 such that the direction of magnetic poles of permanent magnets 6, which face outer lower portions of two iron plates 7, is substantially in parallel to the direction of conveyance. FIG. 25C shows a system wherein a support device is situated on a convey member 22 such that the direction of magnetic poles of permanent magnets 6, which face inner bottom portions of two iron plates 7, is substantially in parallel to the direction of conveyance. FIG. 25D shows a system wherein a support device is situated on a convey member 22 such that the direction of magnetic poles of permanent magnets 6, which face outer bottom portions of two iron plates 7, is substantially in parallel to the direction of conveyance. FIG. 25E shows a system wherein a support device is situated on a convey member 22 such that the direction of magnetic poles of permanent magnets 6, which face inner lower and inner upper portions of two iron plates 7, is substantially in parallel to the direction of conveyance. FIG. 25F shows a system wherein a support device is situated on a convey member 22 such that the direction of magnetic poles of permanent magnets 6, which face outer lower and outer upper portions of two iron plates 7, is substantially in parallel to the direction of conveyance. FIG. 25G shows a system wherein a support device is situated on a convey member 22 such that the direction of magnetic poles of permanent magnets 6, which face inner portions of two iron plates 7, is substantially perpendicular to the direction of conveyance. FIG. 25H shows a system wherein a support device is situated on a convey member 22 such that the direction of magnetic poles of permanent magnets 6, which face outer portions of two iron plates 7, is substantially perpendicular to the direction of conveyance. As can be seen in FIGS. 25F–25H, the width of the iron plate 7 is smaller than the distance between the magnetic poles of the magnets 6.

The superconductor material 3 fixed in the container 4 need not be situated below or above the yoke 5 disposed at both ends of the permanent magnet 6. It suffices that magnetic fluxes emanating from the permanent magnet 6 pass through the superconductor material 3. For example, as shown in FIG. 26, the superconductor material 3, yoke and permanent magnets 6 can all be housed within the container 4. The container 4 in which the superconductor material 3, yoke and permanent magnets 6 can be regarded as support device 1. Although the superconductor material 3 shown in FIG. 26 has a cylindrical shape, it may have other shapes.

The present is not limited to the above embodiments. For example, in the embodiments, the flat iron plate (magnetic material) is levitated by the support device. However, the positional relationship between the support device and iron plate and the cross-sectional shape of the iron plate are not limited at all. For example, a magnetic material or iron may be formed in a cylindrical shape, thereby obtaining a superconducting magnetic bearing.

In each of the above embodiments, the support device is formed by combining the superconductor material with the yoke and permanent magnet. The use of the yoke and permanent magnet is not required. If predetermined magnetic fluxes are pinned in the superconductor material, the iron core or permanent magnet may not be used. The permanent magnet may be replaced by an electromagnet.

As has been described above, according to the system of the present invention, the convey member can be stably levitated without the need to perform special control with use of many sensors and, in addition, the convey member can be stably run in the non-contact state even when an external force is applied to the convey member.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A system for levitating and guiding an object by magnetic force, comprising:
    a first member;
    a second member situated to face the first member; and
    levitating and guide force generating means for generating a levitating and guide force acting between the first member and the second member, said levitating and guide force generating means including a magnetic flux generating unit, disposed on the first member, for generating magnetic fluxes for producing a predetermined magnetic field, an iron member, situated on the second member, for receiving the magnetic fluxes generated by the magnetic flux generating unit, and a superconductor unit, provided on the first member between the magnetic flux generating unit and the iron member, for trapping the magnetic fluxes generated by the magnetic flux generating unit at the time of transition from the normal conduction state to the superconduction state of the superconductor unit.

2. The system according to claim 1, wherein said first member comprises a support member, and said second member comprises a convey member.

3. The system according to claim 1, wherein said first member comprises a convey member, and said second member comprises a support member.

4. The system according to claim 1, wherein said magnetic flux generating unit includes at least two magnetic poles and a yoke connected to the magnetic poles, said superconductor unit is situated near said magnetic flux generating unit, and said iron member is situated with a predetermined gap between itself and said superconductor unit.

5. The system according to claim 1, wherein said levitating and guide force generating means comprises:
    first and second magnetic flux generating units, disposed on the first member, for generating first and second magnetic fluxes for producing first and second magnetic fields, the directions of said first and second magnetic fields being opposite to each other;
    a single iron member, disposed on a predetermined location on the second member at which said iron member is sensitive to the first and second magnetic fields, for receiving the first and second magnetic fluxes generated by said first and second magnetic flux generating units; and
    first and second superconductor units, provided on said first member between said iron member and said first and second magnetic flux generating units, for trapping the first and second magnetic fluxes generated by the first and second magnetic flux generating units at the time of transition from the normal conduction state to the superconduction state of the first and second superconductor units.

6. A system for levitating and guiding an object by magnetic force, comprising:
    a support member;
    a convey member situated to face the support member;
    a magnetic flux generating unit, disposed on the support member, for generating magnetic fluxes for producing a predetermined magnetic field;
    an iron member, situated on the convey member, for receiving the magnetic fluxes generated by the magnetic flux generating unit; and
    a superconductor unit, provided on the support member between the magnetic flux generating unit and the iron member, for trapping the magnetic fluxes generated by the magnetic flux generating unit at the time of transition from the normal conduction state to the superconduction state of the superconductor unit, and producing a levitating and guide force on the basis of the trapped magnetic fluxes.

7. The system according to claim 6, further comprising a propelling force generating unit for generating a propelling force for conveying said convey member in the longitudinal direction of said support member.

8. The system according to claim 7, wherein said propelling force generating unit includes a linear motor.

9. The system according to claim 6, wherein said superconductor unit comprises:
    a container element having an inner space;
    a superconductor material element, provided within the inner space of said container element, for trapping the magnetic fluxes generated by the magnetic flux generating unit at the time of transition from the normal conduction state to the superconduction state of the superconductor unit; and
    a refrigerant supply element for supplying the inner space of said container element with a refrigerant for bringing the superconductor material element into the superconducting state.

10. The system according to claim 6, wherein said superconductor unit comprises:
    a container element having an inner space;
    a magnetic flux generating element situated within the inner space of said container element;
    a superconductor material element, provided within the inner space of said container element, for trapping the magnetic fluxes generated by the magnetic flux generating unit at the time of transition from the normal conduction state to the superconduction state of the superconductor unit; and
    a refrigerant supply element for supplying the inner space of said container element with a refrigerant for bringing the superconductor material element into the superconducting state.

11. The system according to claim 6, wherein said support member is an elongated member, said superconductor unit comprises a plurality of superconducting elements, and said magnetic flux generating unit comprises a plurality of magnetic flux generating elements.

12. The system according to claim 11, wherein said plurality of superconductor elements are arranged at predetermined intervals in the longitudinal direction of said elongated member, and said plurality of magnetic flux generating elements are mounted on said superconductor elements respectively.

13. The system according to claim 11, wherein each of said plurality of superconductor elements comprises:

a container having an inner space;

a superconductor material, provided within the inner space of said container, for trapping the magnetic fluxes generated by the magnetic flux generating unit at the time of transition from the normal conduction state to the superconduction state of the superconductor unit; and refrigerant supply means for supplying the inner space of said container element with a refrigerant for bringing the superconductor material element into the superconducting state.

14. The system according to claim 6, wherein said support member includes an auxiliary member for smoothing the convey operation of said convey member.

15. The system according to claim 6, wherein said convey member includes an auxiliary member for smoothing the convey operation of said convey member.

16. A system for levitating and guiding an object by magnetic force, comprising:

a convey member;

a support member situated to face the convey member;

a magnetic flux generating unit, disposed on the convey member, for generating magnetic fluxes for producing a predetermined magnetic field;

an iron member, situated on the support member, for receiving the magnetic fluxes generated by the magnetic flux generating unit; and a superconductor unit, provided on the convey member between the magnetic flux generating unit and the iron member, for trapping the magnetic fluxes generated by the magnetic flux generating unit at the time of transition from the normal conduction state to the superconduction state of the superconductor unit, and producing a levitating and guide force on the basis of the trapped magnetic fluxes.

17. The system according to claim 16, further comprising a propelling force generating unit for generating a propelling force for conveying said convey member in the longitudinal direction of said support member.

18. The system according to claim 17, wherein said propelling force generating unit includes a linear motor.

19. The system according to claim 16, wherein said superconductor unit comprises:

a container element having an inner space;

a superconductor material element, provided within the inner space of said container element, for trapping the magnetic fluxes generated by the magnetic flux generating unit at the time of transition from the normal conduction state to the superconduction state of the superconductor unit; and a refrigerant supply element for supplying the inner space of said container element with a refrigerant for bringing the superconductor material element into the superconducting state.

20. The system according to claim 16, wherein said superconductor unit comprises:

a container element having an inner space;

a magnetic flux generating element situated within the inner space of said container element;

a superconductor material element, provided within the inner space of said container element, for trapping the magnetic fluxes generated by the magnetic flux generating unit at the time of transition from the normal conduction state to the superconduction state of the superconductor unit; and a refrigerant supply element for supplying the inner space of said container element with a refrigerant for bringing the superconductor material element into the superconducting state.

21. The system according to claim 16, wherein said support member is an elongated member, said superconductor unit comprises a plurality of superconducting elements, and said magnetic flux generating unit comprises a plurality Of magnetic flux generating elements.

22. The system according to claim 21, wherein said plurality of superconductor elements are arranged at predetermined intervals in the longitudinal direction of said elongated member, and said plurality of magnetic flux generating elements are mounted on said superconductor elements respectively.

23. The system according to claim 21, wherein each of said plurality of superconductor elements comprises:

a container having an inner space;

a superconductor material, provided within the inner space of said container, for trapping the magnetic fluxes generated by the magnetic flux generating unit at the time of transition from the normal conduction state to the superconduction state of the superconductor unit; and refrigerant supply means for supplying the inner space of said container element with a refrigerant for bringing the superconductor material element into the superconducting state.

24. The system according to claim 16, wherein said support member includes an auxiliary member for smoothing the convey operation of said convey member.

25. The system according to claim 16, wherein said convey member includes an auxiliary member for smoothing the convey operation of said convey member.

26. The system according to claim 16, wherein said convey member comprises at least four said superconductor elements, and each of said superconductor elements includes gap-varying means for varying a floating gap between the superconductor element and the iron member.

27. The system according to claim 26, wherein said gap-varying means comprises a plurality of division plates and a rotational shaft for connecting said division plates such that said division plates are rotatable relative to each other in a plane perpendicular to the direction of conveyance.

28. A system for levitating and guiding an object by magnetic force, comprising:

a first member;

a second member situated to face the first member;

levitating and guide force generating means for generating a levitating and guide force acting between the first member and the second member, said levitating and guide force generating means including a magnetic flux generating unit, disposed on the first member, for generating magnetic fluxes for producing a predetermined magnetic field, a iron member, situated on the second member, for receiving the magnetic fluxes generated by the magnetic flux generating unit, and a superconductor unit, provided on the first member between the magnetic flux generating unit and the iron member, for trapping the magnetic fluxes generated by the magnetic flux generating unit at the time of transition from the normal conduction state to the superconduction state of the superconductor unit; and propelling force generating means for generating a propelling force acting in the longitudinal direction of said first and second members.

29. The system according to claim 1, wherein said levitating and guide force generating means includes levitating and guide attractive force generating means for generating a levitating and guide attractive force acting between the first member and the second member, said levitating and guide attractive force generating means including said magnetic flux generating unit, disposed on the first member, for generating magnetic fluxes for producing a predetermined magnetic field, said iron member, situated on the second member, for receiving the magnetic fluxes generated by the magnetic flux generating unit, and said superconductor unit, provided on the first member between the magnetic flux generating unit and the iron member, for trapping the magnetic fluxes generated by the magnetic flux generating unit at the time of transition from the normal conduction state to the superconduction state of the superconductor unit.

30. The system according to claim 1, wherein the iron member of said levitating and guide force generating means has a width which is smaller than a distance between the magnetic poles of the magnetic flux generating unit.

* * * * *